United States Patent
Fu et al.

(10) Patent No.: US 11,615,368 B2
(45) Date of Patent: Mar. 28, 2023

(54) SYSTEMS AND METHODS FOR DETERMINING DELIVERY TIME AND ROUTE ASSIGNMENTS

(71) Applicant: Walmart Apollo, LLC, Bentonville, AR (US)

(72) Inventors: Mingang Fu, Palo Alto, CA (US); Madhavan Kandhadai Vasantham, Dublin, CA (US); Aditya Arcot Srinivasan, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 493 days.

(21) Appl. No.: 16/178,526

(22) Filed: Nov. 1, 2018

(65) Prior Publication Data

US 2020/0143319 A1    May 7, 2020

(51) Int. Cl.
*G06Q 10/0833* (2023.01)
*G05D 1/02* (2020.01)
*G06N 20/00* (2019.01)

(52) U.S. Cl.
CPC ....... *G06Q 10/0833* (2013.01); *G05D 1/0217* (2013.01); *G06N 20/00* (2019.01)

(58) Field of Classification Search
CPC ... G06Q 10/0833; G06N 20/00; G05D 1/0217
See application file for complete search history.

(56) References Cited

U.S. PATENT DOCUMENTS

| | | | | |
|---|---|---|---|---|
| 5,444,444 A | * | 8/1995 | Ross | B07C 3/00 340/988 |
| 5,922,040 A | * | 7/1999 | Prabhakaran | G08G 1/127 701/532 |
| 6,240,362 B1 | * | 5/2001 | Gaspard, II | G06Q 10/08 701/410 |
| 6,701,299 B2 | | 3/2004 | Kraisser et al. | |

(Continued)

FOREIGN PATENT DOCUMENTS

| CN | 111144822 A | * | 5/2020 |
|---|---|---|---|
| JP | 2007017192 A | | 1/2007 |

(Continued)

OTHER PUBLICATIONS

Real Carbonneau, "Application of machine learning techniques for supply chain demand forecasting", published by Elsevier in 2008 (Year: 2008).*

(Continued)

*Primary Examiner* — Omar Zeroual
(74) *Attorney, Agent, or Firm* — Morgan, Lewis & Bockius LLP; Manita Rawat

(57) ABSTRACT

Systems and methods for optimizing delivery vehicle resources (e.g. a plurality of vehicles) are described herein. Available time slots for the plurality of vehicles are determined and presented to a user. In response to receiving a delivery order indicating a selected time slot, the delivery order is assigned to a vehicle from the plurality of vehicles based on a time slot indicated in the delivery order and a set of delivery parameters. A delivery route is calculated for (Continued)

each vehicle having a delivery order based on the set of delivery parameters. An optimized delivery route is calculated for each vehicle having a delivery order based on the set of delivery parameters.

17 Claims, 17 Drawing Sheets

(56) References Cited

U.S. PATENT DOCUMENTS

| | | | |
|---|---|---|---|
| 6,754,634 B1 | 6/2004 | Ho | |
| 6,963,861 B1* | 11/2005 | Boucher | G07B 17/00362 |
| | | | 705/401 |
| 7,222,081 B1 | 5/2007 | Sone | |
| 7,251,612 B1* | 7/2007 | Parker | G06Q 10/06316 |
| | | | 705/7.22 |
| 7,430,517 B1* | 9/2008 | Barton | G06Q 10/06316 |
| | | | 705/13 |
| 7,437,305 B1* | 10/2008 | Kantarjiev | G06Q 30/0201 |
| | | | 705/7.29 |
| 7,775,431 B2* | 8/2010 | Skaaksrud | G06Q 10/08 |
| | | | 235/462.01 |
| 8,015,023 B1* | 9/2011 | Lee | G06Q 10/08 |
| | | | 700/226 |
| 8,126,903 B2* | 2/2012 | Lehmann | G06Q 10/06 |
| | | | 707/758 |
| 8,160,972 B1* | 4/2012 | Tannenbaum | G06Q 10/0835 |
| | | | 705/336 |
| 8,224,707 B1* | 7/2012 | Smith | G06Q 10/101 |
| | | | 705/26.1 |
| 8,429,019 B1 | 4/2013 | Yeatts et al. | |
| 8,438,088 B2* | 5/2013 | Cunniff | G06Q 40/00 |
| | | | 705/40 |
| 8,521,656 B2* | 8/2013 | Zimberoff | G06Q 30/0641 |
| | | | 705/330 |
| 9,141,876 B1* | 9/2015 | Jones | G07D 11/12 |
| 9,256,852 B1* | 2/2016 | Myllymaki | G06Q 10/083 |
| 9,494,937 B2* | 11/2016 | Siegel | G05D 1/104 |
| 9,619,775 B1* | 4/2017 | Saito | G06Q 10/08345 |
| 9,626,639 B2* | 4/2017 | Gibbon | G06Q 10/083 |
| 9,691,091 B2* | 6/2017 | Jones | G06Q 30/0611 |
| 9,857,188 B1 | 1/2018 | O'Hare et al. | |
| 10,157,362 B1* | 12/2018 | Johansson | G06Q 10/083 |
| 10,163,070 B1* | 12/2018 | Phillips | G06Q 10/087 |
| 10,204,528 B2* | 2/2019 | Truong | G07C 5/02 |
| 10,227,178 B2* | 3/2019 | High | B60P 3/007 |
| 10,233,021 B1* | 3/2019 | Brady | G05D 1/0282 |
| 10,245,993 B1* | 4/2019 | Brady | B60P 7/13 |
| 10,248,731 B1* | 4/2019 | Brouwer, II | G06Q 50/186 |
| 10,255,577 B1* | 4/2019 | Steves | G05D 1/0212 |
| 10,304,027 B1* | 5/2019 | Haque | G06Q 50/30 |
| 10,514,690 B1* | 12/2019 | Siegel | G06Q 10/08355 |
| 10,627,244 B1* | 4/2020 | Lauka | G01C 21/3623 |
| 10,839,695 B2 | 11/2020 | Kuncl et al. | |
| 10,846,633 B2 | 11/2020 | Magazinik et al. | |
| 11,157,866 B2 | 10/2021 | Bostick et al. | |
| 2001/0047285 A1* | 11/2001 | Borders | G06Q 30/02 |
| | | | 705/7.24 |
| 2001/0056395 A1* | 12/2001 | Khan | G06Q 30/0226 |
| | | | 705/14.27 |
| 2002/0007299 A1* | 1/2002 | Florence | G06Q 10/0631 |
| | | | 705/7.12 |
| 2002/0052688 A1* | 5/2002 | Yofu | G01C 21/3605 |
| | | | 701/420 |
| 2002/0073049 A1* | 6/2002 | Dutta | G06Q 20/401 |
| | | | 705/26.1 |
| 2002/0107820 A1* | 8/2002 | Huxter | G06Q 30/02 |
| | | | 705/28 |
| 2002/0147654 A1* | 10/2002 | Kraisser | G06Q 10/08 |
| | | | 705/330 |
| 2002/0152174 A1* | 10/2002 | Woods | G06Q 30/04 |
| | | | 705/61 |
| 2002/0188517 A1* | 12/2002 | Banerjee | G06Q 10/08 |
| | | | 705/26.8 |
| 2003/0040944 A1* | 2/2003 | Hileman | G06Q 10/08 |
| | | | 705/5 |
| 2003/0078873 A1* | 4/2003 | Cohen | G06Q 30/0601 |
| | | | 705/37 |
| 2003/0084125 A1* | 5/2003 | Nagda | G06Q 10/08 |
| | | | 709/219 |
| 2003/0200111 A1* | 10/2003 | Damji | G06Q 10/08345 |
| | | | 705/335 |
| 2003/0236679 A1* | 12/2003 | Galves | G06Q 50/182 |
| | | | 705/309 |
| 2004/0015393 A1* | 1/2004 | Fong | G07F 17/13 |
| | | | 705/13 |
| 2004/0030572 A1* | 2/2004 | Campbell | G01C 21/26 |
| | | | 705/333 |
| 2004/0030604 A1* | 2/2004 | Young | G06Q 30/02 |
| | | | 705/307 |
| 2004/0034571 A1* | 2/2004 | Wood | G06Q 30/0601 |
| | | | 705/26.1 |
| 2004/0093302 A1* | 5/2004 | Baker | G06Q 30/0615 |
| | | | 705/37 |
| 2004/0107110 A1 | 6/2004 | Gottlieb et al. | |
| 2004/0199285 A1* | 10/2004 | Berichon | G06Q 10/087 |
| | | | 700/225 |
| 2005/0006470 A1* | 1/2005 | Mrozik | G06Q 10/08 |
| | | | 235/384 |
| 2005/0209913 A1* | 9/2005 | Wied | G06Q 10/08 |
| | | | 705/330 |
| 2005/0216364 A1* | 9/2005 | Jurisic | G06Q 30/0641 |
| | | | 705/27.1 |
| 2005/0228705 A1* | 10/2005 | Irwin | G06Q 10/08 |
| | | | 705/7.19 |
| 2005/0251330 A1* | 11/2005 | Waterhouse | G08G 1/202 |
| | | | 701/465 |
| 2005/0278063 A1 | 12/2005 | Hersh et al. | |
| 2006/0026030 A1* | 2/2006 | Jacobs | G06Q 10/083 |
| | | | 705/26.1 |
| 2006/0085318 A1* | 4/2006 | Cohoon | G06Q 30/08 |
| | | | 705/37 |
| 2006/0155595 A1* | 7/2006 | Johannsen | G06Q 10/06395 |
| | | | 705/7.41 |
| 2006/0161335 A1 | 7/2006 | Beinhaker | |
| 2006/0235739 A1* | 10/2006 | Levis | G06Q 10/08 |
| | | | 705/1.1 |
| 2006/0238334 A1* | 10/2006 | Mangan | G06Q 10/08 |
| | | | 340/539.13 |
| 2006/0276960 A1* | 12/2006 | Adamczyk | G06Q 10/06 |
| | | | 701/516 |
| 2007/0015518 A1* | 1/2007 | Winter | H04W 68/00 |
| | | | 455/456.1 |
| 2007/0038506 A1* | 2/2007 | Noble | G06Q 10/08 |
| | | | 705/13 |
| 2007/0038673 A1* | 2/2007 | Broussard | G06Q 50/28 |
| 2007/0050279 A1* | 3/2007 | Huang | G06Q 30/0207 |
| | | | 705/14.1 |
| 2007/0083410 A1* | 4/2007 | Hanna | G06Q 10/0833 |
| | | | 705/336 |
| 2007/0112647 A1* | 5/2007 | Borders | G06Q 30/016 |
| | | | 705/26.81 |
| 2007/0185778 A1* | 8/2007 | Weng | G06Q 30/0635 |
| | | | 705/26.41 |
| 2007/0257774 A1* | 11/2007 | Stumpert | G06Q 10/08 |
| | | | 340/7.1 |
| 2008/0027737 A1* | 1/2008 | Watkins | G06Q 50/188 |
| | | | 705/335 |
| 2008/0082257 A1* | 4/2008 | Lee | G01C 21/3697 |
| | | | 701/465 |
| 2008/0109246 A1* | 5/2008 | Russell | G06Q 10/04 |
| | | | 414/800 |
| 2008/0235147 A1* | 9/2008 | Jensen | G06Q 10/08 |
| | | | 705/37 |
| 2008/0288368 A1* | 11/2008 | Marks | G06Q 30/0641 |
| | | | 705/26.81 |
| 2009/0005963 A1* | 1/2009 | Jarvinen | G01C 21/3438 |
| | | | 701/533 |

(56) References Cited

U.S. PATENT DOCUMENTS

| | | | |
|---|---|---|---|
| 2009/0037095 A1* | 2/2009 | Jani | G06Q 30/0284 705/417 |
| 2009/0058646 A1* | 3/2009 | Waterhouse | A01K 11/008 340/572.1 |
| 2009/0070236 A1* | 3/2009 | Cohen | G06Q 40/04 705/37 |
| 2009/0099972 A1* | 4/2009 | Angert | G06Q 30/0633 705/26.1 |
| 2009/0201201 A1* | 8/2009 | Foster | G06Q 10/08 342/357.75 |
| 2009/0254405 A1 | 10/2009 | Hollis | |
| 2009/0296990 A1* | 12/2009 | Holland | G06T 7/60 382/106 |
| 2010/0057341 A1* | 3/2010 | Bradburn | G06Q 10/047 701/533 |
| 2010/0222908 A1* | 9/2010 | Gombert | G16Z 99/00 700/98 |
| 2010/0234990 A1* | 9/2010 | Zini | G05D 1/0274 700/245 |
| 2010/0235210 A1* | 9/2010 | Nadrotowicz, Jr. | G06Q 10/1097 701/533 |
| 2010/0332284 A1* | 12/2010 | Hilbush | G06Q 10/06311 705/336 |
| 2011/0054979 A1* | 3/2011 | Cova | G06Q 10/087 705/28 |
| 2011/0055046 A1* | 3/2011 | Bowen | G06Q 30/0623 707/802 |
| 2011/0099040 A1* | 4/2011 | Felt | G06Q 10/02 715/764 |
| 2011/0112761 A1* | 5/2011 | Hurley | G01C 21/32 701/465 |
| 2011/0119159 A1* | 5/2011 | Chou | G06Q 30/0641 707/802 |
| 2011/0161964 A1 | 6/2011 | Piazza et al. | |
| 2011/0192893 A1* | 8/2011 | Waugh | G06V 10/145 235/487 |
| 2011/0258134 A1* | 10/2011 | Mendez | G06Q 10/0832 705/332 |
| 2012/0078743 A1* | 3/2012 | Betancourt | G06Q 30/08 705/338 |
| 2012/0173448 A1* | 7/2012 | Rademaker | G06Q 10/083 705/338 |
| 2012/0174002 A1* | 7/2012 | Martin | G06F 9/451 715/763 |
| 2012/0253892 A1* | 10/2012 | Davidson | G06Q 10/0631 705/7.42 |
| 2013/0024390 A1* | 1/2013 | Zlobinsky | G06Q 10/101 705/319 |
| 2013/0117193 A1* | 5/2013 | Ni | G06Q 10/08 705/334 |
| 2013/0144763 A1* | 6/2013 | Skyberg | G06Q 50/28 705/27.1 |
| 2013/0198042 A1* | 8/2013 | Seifen | G06Q 10/083 705/26.81 |
| 2013/0238462 A1* | 9/2013 | Lutnick | G06Q 30/08 705/26.4 |
| 2013/0246301 A1* | 9/2013 | Radhakrishnan | G06Q 30/0282 705/347 |
| 2013/0268454 A1* | 10/2013 | Mateer | G06Q 10/08 705/330 |
| 2013/0325553 A1 | 12/2013 | Nadiadi et al. | |
| 2013/0325741 A1* | 12/2013 | Smalling | G06Q 10/083 705/337 |
| 2013/0338855 A1* | 12/2013 | Mason | G07C 5/008 701/2 |
| 2014/0012772 A1* | 1/2014 | Pretorius | G06Q 50/28 705/330 |
| 2014/0023264 A1* | 1/2014 | Branch | G01N 31/229 382/141 |
| 2014/0032440 A1* | 1/2014 | Chandrashekar | G06Q 50/28 705/335 |
| 2014/0040043 A1* | 2/2014 | Barron | G06Q 30/06 705/14.66 |
| 2014/0046585 A1* | 2/2014 | Morris, IV | G01C 21/00 701/400 |
| 2014/0075572 A1* | 3/2014 | Mehring | G06K 7/10366 726/28 |
| 2014/0081445 A1* | 3/2014 | Villamar | G06Q 10/08 701/19 |
| 2014/0095350 A1* | 4/2014 | Carr | G06Q 30/0603 705/26.8 |
| 2014/0149269 A1* | 5/2014 | Kantarjiev | G06Q 50/28 705/330 |
| 2014/0164167 A1* | 6/2014 | Taylor | G06Q 30/0611 705/26.4 |
| 2014/0172739 A1* | 6/2014 | Anderson | G06Q 10/0836 705/338 |
| 2014/0180914 A1* | 6/2014 | Abhyanker | G05D 1/102 705/332 |
| 2014/0188750 A1* | 7/2014 | Seiler | G06Q 10/0834 705/334 |
| 2014/0195421 A1* | 7/2014 | Lozito | G06Q 20/14 705/40 |
| 2014/0244110 A1 | 8/2014 | Tharaldson et al. | |
| 2014/0258167 A1* | 9/2014 | Rohmann | G06Q 10/08345 705/335 |
| 2014/0277900 A1* | 9/2014 | Abhyanker | G05D 1/0274 701/25 |
| 2014/0279646 A1* | 9/2014 | Bodenhamer | G06Q 10/08345 705/330 |
| 2014/0317005 A1* | 10/2014 | Balwani | B65D 81/38 705/317 |
| 2014/0330739 A1 | 11/2014 | Falcone et al. | |
| 2014/0330741 A1* | 11/2014 | Bialynicka-Birula | G06Q 10/0838 705/341 |
| 2015/0039362 A1* | 2/2015 | Haque | G06Q 10/0631 705/7.12 |
| 2015/0046362 A1* | 2/2015 | Muetzel | G06Q 10/08 705/341 |
| 2015/0081360 A1 | 3/2015 | Sun et al. | |
| 2015/0081581 A1* | 3/2015 | Gishen | G06Q 10/083 705/330 |
| 2015/0088620 A1* | 3/2015 | Wittek | G06Q 30/0207 705/14.1 |
| 2015/0100514 A1* | 4/2015 | Parris | G06Q 10/0837 705/340 |
| 2015/0120600 A1 | 4/2015 | Luwang et al. | |
| 2015/0142591 A1* | 5/2015 | High | G06Q 30/0613 705/26.41 |
| 2015/0149298 A1* | 5/2015 | Tapley | G06Q 30/0633 705/14.66 |
| 2015/0178678 A1* | 6/2015 | Carr | G06Q 10/0838 705/341 |
| 2015/0178778 A1* | 6/2015 | Lee | G06Q 30/0261 705/14.58 |
| 2015/0186869 A1* | 7/2015 | Winters | G06Q 50/28 705/26.81 |
| 2015/0202770 A1* | 7/2015 | Patron | G06Q 30/0265 901/50 |
| 2015/0206267 A1* | 7/2015 | Khanna | G06Q 50/30 705/417 |
| 2015/0219467 A1* | 8/2015 | Ingerman | G01C 21/3611 701/426 |
| 2015/0294261 A1* | 10/2015 | Adell | G06Q 10/083 705/330 |
| 2015/0294262 A1* | 10/2015 | Nelson | G06Q 10/083 705/330 |
| 2015/0310388 A1* | 10/2015 | Jamthe | H04L 67/02 705/26.4 |
| 2015/0348282 A1* | 12/2015 | Gibbon | G06Q 50/30 382/103 |
| 2016/0012392 A1* | 1/2016 | Paden | G06Q 10/0838 705/341 |
| 2016/0019501 A1* | 1/2016 | Olechko | G06Q 10/08355 705/338 |

(56) References Cited

U.S. PATENT DOCUMENTS

| | | | |
|---|---|---|---|
| 2016/0037481 A1* | 2/2016 | Won | H04W 68/00 |
| | | | 715/771 |
| 2016/0042319 A1* | 2/2016 | Mauch | G06Q 10/0838 |
| | | | 705/341 |
| 2016/0042321 A1* | 2/2016 | Held | G06Q 10/08355 |
| | | | 705/338 |
| 2016/0048804 A1* | 2/2016 | Paul | G06Q 10/08355 |
| | | | 705/338 |
| 2016/0063435 A1* | 3/2016 | Shah | G06Q 30/0633 |
| | | | 705/44 |
| 2016/0071056 A1* | 3/2016 | Ellison | G06Q 10/08355 |
| | | | 705/338 |
| 2016/0104112 A1* | 4/2016 | Gorlin | G06F 16/29 |
| | | | 705/338 |
| 2016/0125356 A1* | 5/2016 | Kellogg | A01K 11/006 |
| | | | 705/332 |
| 2016/0148303 A1* | 5/2016 | Carr | G06Q 30/0635 |
| | | | 705/26.81 |
| 2016/0171439 A1* | 6/2016 | Ladden | G06F 3/0484 |
| | | | 705/340 |
| 2016/0210591 A1* | 7/2016 | Lafrance | G06Q 10/047 |
| 2016/0224935 A1* | 8/2016 | Burnett | G06Q 10/0834 |
| 2016/0232487 A1* | 8/2016 | Yonker | G06Q 10/0834 |
| 2016/0239788 A1* | 8/2016 | Hanks | G06Q 30/04 |
| 2016/0300185 A1* | 10/2016 | Zamer | G06Q 10/0835 |
| 2016/0328669 A1* | 11/2016 | Droege | G06Q 10/06311 |
| 2016/0364678 A1* | 12/2016 | Cao | G06Q 10/083 |
| 2016/0379167 A1* | 12/2016 | Raman | G06Q 10/1097 |
| | | | 705/338 |
| 2017/0011180 A1* | 1/2017 | Andrews | G06Q 10/10 |
| 2017/0011340 A1* | 1/2017 | Gabbai | G08G 5/0034 |
| 2017/0059337 A1 | 3/2017 | Barker et al. | |
| 2017/0076058 A1* | 3/2017 | Stong | G16H 20/10 |
| 2017/0083862 A1* | 3/2017 | Loubriel | G06Q 10/0835 |
| 2017/0090484 A1* | 3/2017 | Obaidi | G06Q 10/0835 |
| 2017/0091709 A1* | 3/2017 | Mishra | G06Q 10/0838 |
| 2017/0091856 A1* | 3/2017 | Canberk | G06Q 10/02 |
| 2017/0127215 A1* | 5/2017 | Khan | H04W 12/64 |
| 2017/0138749 A1* | 5/2017 | Pan | G01C 21/3438 |
| 2017/0154347 A1* | 6/2017 | Bateman | G06Q 40/08 |
| 2017/0178057 A1* | 6/2017 | Al Rifai | H04W 4/02 |
| 2017/0178070 A1 | 6/2017 | Wang et al. | |
| 2017/0193404 A1* | 7/2017 | Yoo | G06Q 20/322 |
| 2017/0193574 A1 | 7/2017 | Marueli | |
| 2017/0213062 A1* | 7/2017 | Jones | G06V 20/13 |
| 2017/0228683 A1* | 8/2017 | Hu | G08G 1/00 |
| 2017/0262790 A1* | 9/2017 | Khasis | G08G 1/012 |
| 2017/0300905 A1* | 10/2017 | Withrow | G06F 16/583 |
| 2017/0323850 A1* | 11/2017 | Lindbo | G06Q 10/087 |
| 2017/0365030 A1* | 12/2017 | Shoham | G08G 1/202 |
| 2018/0018868 A1* | 1/2018 | Ren | G08G 1/015 |
| 2018/0060814 A1* | 3/2018 | Seaman | G06Q 10/0838 |
| 2018/0096287 A1* | 4/2018 | Senger | G06Q 10/08 |
| 2018/0107967 A1* | 4/2018 | Bulcao | G06Q 50/28 |
| 2018/0107979 A1* | 4/2018 | Westover | G06Q 30/0611 |
| 2018/0130017 A1* | 5/2018 | Gupte | G01N 33/00 |
| 2018/0158020 A1* | 6/2018 | Khasis | G01C 21/343 |
| 2018/0283890 A1 | 10/2018 | Zhao et al. | |
| 2018/0285806 A1* | 10/2018 | Scofield | G06Q 10/08 |
| 2018/0299895 A1* | 10/2018 | Knotts | H04L 67/12 |
| 2018/0315319 A1* | 11/2018 | Spector | G06Q 10/06316 |
| 2018/0350214 A1* | 12/2018 | Roth | G06V 20/20 |
| 2018/0351671 A1* | 12/2018 | Sadeghi | H04H 20/74 |
| 2018/0356823 A1* | 12/2018 | Cooper | G08G 5/0034 |
| 2018/0365643 A1* | 12/2018 | Zhu | G06K 19/06037 |
| 2019/0066047 A1* | 2/2019 | O'Brien | B64U 70/30 |
| 2019/0101401 A1* | 4/2019 | Balva | G06Q 50/30 |
| 2019/0114588 A1* | 4/2019 | Radetzki | G05D 1/0217 |
| 2019/0156253 A1* | 5/2019 | Malyack | G06N 5/022 |
| 2019/0156283 A1* | 5/2019 | Abebe | G06Q 10/083 |
| 2019/0164126 A1* | 5/2019 | Chopra | G06Q 10/08355 |
| 2019/0180229 A1* | 6/2019 | Phillips | G06Q 10/0833 |
| 2019/0197475 A1* | 6/2019 | Bianconcini | G06Q 10/08355 |
| 2019/0205857 A1* | 7/2019 | Bell | G06Q 10/087 |
| 2019/0220816 A1* | 7/2019 | Frye | G06Q 30/0283 |
| 2019/0266557 A1* | 8/2019 | Berk | G06Q 10/0832 |
| 2019/0266690 A1* | 8/2019 | Mandeno | G06Q 30/0283 |
| 2019/0285426 A1* | 9/2019 | Mitchell | G01C 21/3446 |
| 2019/0333130 A1* | 10/2019 | Jha | G06Q 30/0635 |
| 2019/0385121 A1* | 12/2019 | Waliany | G06F 9/54 |
| 2020/0097900 A1* | 3/2020 | Kibbey | G06F 16/212 |
| 2020/0097908 A1* | 3/2020 | Glasfurd | G06N 5/046 |
| 2020/0104962 A1* | 4/2020 | Aich | G06Q 50/30 |
| 2020/0116508 A1* | 4/2020 | Dashti | G06Q 10/08355 |
| 2020/0117683 A1* | 4/2020 | Ji | G06F 16/285 |
| 2020/0118071 A1* | 4/2020 | Venkatesan | G06N 7/01 |
| 2020/0134014 A1* | 4/2020 | Tiwari | G06N 20/00 |
| 2020/0134557 A1* | 4/2020 | Pevzner | G06Q 10/0834 |
| 2020/0160148 A1* | 5/2020 | Garg | G06N 3/042 |
| 2020/0210960 A1* | 7/2020 | Soryal | G01C 21/343 |
| 2020/0249040 A1* | 8/2020 | Yamaguchi | G06Q 10/047 |
| 2020/0265383 A1* | 8/2020 | Zhang | G06Q 10/08355 |
| 2021/0150467 A1* | 5/2021 | Sakai | B60P 3/20 |
| 2021/0293550 A1 | 9/2021 | Migita | |
| 2022/0067657 A1* | 3/2022 | Neumann | G06Q 10/047 |

FOREIGN PATENT DOCUMENTS

| | | | |
|---|---|---|---|
| WO | 0169488 | 9/2001 | |
| WO | WO-0169488 A1 * | 9/2001 | G06Q 10/047 |
| WO | 2017062492 | 4/2017 | |

OTHER PUBLICATIONS

Mahajan Manoj, "Backward and Forward Scheduling" Jun. 30, 2018, 2 pages.

Xu, Jianliang, "Client-Side Data Caching in Mobile Computing Environments", Hong Kong University of Science and Technology, Jun. 2002.

"Coincide," Merriam-Webster, Nov. 2, 2016 (Year: 2016).

"Determining time windows in urban freight transport: A city cooperative approach," by Derya Eren Akyol, Rene B.M, and De Koster, Department of Department of Industrial Engineering, Dokus Eylul University, Jul. 12, 2018 (Year: 2018).

"Solving Combinatorial Optimization Problems Using Genetic Algorithms and Ant Colony Optimization," by Gautham Puttur Rajappa , Aug. 2012 (Year: 2012).

"Solving multi depot vehicle routing problem for Iowa recycled paper by Tabu Search heuristic," by Supachai Pathumnakul, 1996 (Year: 1996).

Agatz, et al., "Time Slot Management in Attended Home Delivery" Apr. 15, 2008, 32 pages.

* cited by examiner

FEATURES

ITEM BASED FEATURES: — 1302
CARRIER_BAG
HAS_AGE_RESTRICTED_ITEMS
HAS_AMBIENT
HAS_CHILLED
HAS_FROZEN
ORDER_WEIGHT
QUANTITY

SHIPPING SOURCE FEATURES: — 1306
STORE_ID_4401
STORE_ID_4441
STORE_ID_4831
STORE_ID_4863

TIME AND GEO BASED FEATURES: — 1307
month_sin
month_cos
day_month_sin
day_month_cos
day_week_sin
day_week_cos
morning_delivery
afternoon_delivery
evening_delivery
is_weekend
latitude
longitude

DELIVERY DESTINATION BASED FEATURES: — 1308
DW_TYPE_Apartment Block: Extra Large
DW_TYPE_Apartment Block: Large
DW_TYPE_Apartment Block: Medium
DW_TYPE_Apartment Block: Small
DW_TYPE_Apartment Block: Very Large
DW_TYPE_Flat
DW_TYPE_Semi-Detached
DW_TYPE_Terraced
DW_TYPE_Unknown

FIG. 13

SYSTEMS AND METHODS FOR DETERMINING DELIVERY TIME AND ROUTE ASSIGNMENTS

TECHNICAL FIELD

This application relates generally to combinatorial resource optimization, and more particularly, relates to optimizing delivery routes in a goods delivery system.

BACKGROUND

At least some known systems and industries provide delivery services to their customers. For example, some industries provide the delivery of goods, such as grocery items, to their customers, which has increasingly become a method by which consumers obtain their grocery needs. For grocery delivery services, the use of delivery vehicle resources can be optimized in order to achieve an efficient and profitable grocery delivery service. One particular optimization solution or system is resource optimization and vehicle routing (ROVR), which is designed to optimize grocery delivery routes based on a number of factors in order to make efficient use of delivery vehicle resources.

However, current solutions, including ROVR cannot scale to handle large order sizes (e.g., 2000 or more orders per day). As the number of delivery orders increases, the combinatorial space to be explored (i.e., the complexity of the optimization problem) increases exponentially. For example, doubling the number of orders may result in an exponential increase in the number of alternative delivery routes that are explored and/or considered. In addition, computational resources become bottlenecked, as the time required to optimize delivery routes increases once the number of orders becomes larger. For example, a single optimization can take longer than three minutes, which may significantly affect an optimization system's ability to allocate computation resources to other stores among a collection of hundreds of stores.

SUMMARY OF THE INVENTION

The embodiments described herein enable the optimization of vehicle resources during delivery of goods, such as grocery items. For example, in one embodiment, a system for optimizing vehicle resources during delivery of goods is disclosed. The system may include a computing device configured to communicate with a vehicle server, wherein the vehicle server is configured to communicatively couple to a plurality of vehicles. The computing device may be configured to receive, from the vehicle server, time data of the plurality of vehicles, wherein the time data includes a plurality of time slots for each of the plurality of vehicles that are used for a plurality of deliveries and determine at least one available time slot among the plurality of time slots and communicate the at least one available time slot to at least one user terminal. The computing device may be configured to receive, from the at least one user terminal, at least one delivery order indicating at least one selected time slot from the at least one available time slot. In response to receiving the at least one delivery order indicating the at least one selected time slot, the computing device may further be configured to assign the delivery order to a vehicle from the plurality of vehicles based, at least in part, on the selected time indicated in the at least one delivery order and at least one parameter for each of the plurality of vehicles. The computing device may be configured to calculate, for the assigned vehicle, an optimized delivery route based, at least in part, on the at least one delivery parameter and transmit the optimized delivery route to the assigned vehicle.

In other embodiments, a method for optimizing vehicle resources during delivery of goods is disclosed. Time data of a plurality of vehicles may be received from a vehicle server, wherein the time data includes a plurality of time slots for each of the plurality of vehicles that are used for a plurality of deliveries and at least one available time slot among the plurality of time slots is determined and communicated to at least one user terminal. At least one delivery order indicating at least one selected time slot may be received from the user terminal. In response to receiving the at least one delivery order indicating the at least one selected time slot, the delivery order may be assigned to a vehicle from the plurality of vehicles based, at least in part, on the selected time indicated in the at least one delivery order and at least one parameter for each of the plurality of vehicles. An optimized delivery route for the assigned vehicle may be calculated, based, at least in part, on the at least one delivery parameter and transmitted to the assigned vehicle.

In yet other embodiments, a non-transitory computer readable medium is disclosed, having instructions stored thereon for optimizing vehicle resources during delivery of goods. The instructions, when executed by a processor, cause a device to perform operations for such optimization. The device may communicate with a vehicle server, wherein the vehicle server is configured to communicatively couple to a plurality of vehicles. The device may receive, from the vehicle server, time data of the plurality of vehicles, wherein the time data includes a plurality of time slots for each of the plurality of vehicles that are used for a plurality of deliveries and determine at least one available time slot among the plurality of time slots and communicate the at least one available time slot to at least one user terminal. The device receive, from the at least one user terminal, at least one delivery order indicating at least one selected time slot from the at least one available time slot. In response to receiving the at least one delivery order indicating the at least one selected time slot, the device may assign the delivery order to a vehicle from the plurality of vehicles based, at least in part, on the selected time indicated in the at least one delivery order and at least one parameter for each of the plurality of vehicles. The device may calculate, for the assigned vehicle, an optimized delivery route based, at least in part, on the at least one delivery parameter and transmit the optimized delivery route to the assigned vehicle.

In some embodiments, a computing device is configured to communicate with a user terminal, a first vehicle server, and a second vehicle server. The first vehicle server may communicate with a first plurality of vehicles that execute (e.g., deliver or pickup) orders in a first geographical area. The second vehicle server may communicate with a second plurality of vehicles that execute orders in a second geographical area. The first geographical area and second geographical area can be different.

The computing device may receive, from the first vehicle server, first shift data for the first plurality of vehicles. First shift data may include a plurality of first time periods, where each first time period corresponds to a window of time that a vehicle of the first plurality of vehicles is available for execution of orders in the first geographical area. The computing device may also receive, from the second vehicle server, second shift data for the second plurality of vehicles. Second shift data includes a plurality of second time periods, where each second time period corresponds to a window of time that a vehicle of the second plurality of vehicles is available for execution of orders in the second geographical area. The computing device may receive, from the user terminal, a selected time slot for a requested order at a requested order location in the second geographical area.

The computing device may then determine a second time period of the plurality of second time periods that at least partially coincides in time with the selected time slot. The computing device may also determine a first time period of the plurality of first time periods based on a start time of the determined second time period.

The computing device may transmit, to the first vehicle server, a first order assignment for the requested order from a pick-up location in the first geographical area to a drop-off location in the second geographical area during the determined first time period. The computing device may transmit, to the second vehicle server, a second order assignment for the requested order from the drop-off location in the second geographical area to the requested order location in the second geographical area during the determined second time period.

In some embodiments, a method includes receiving, from a first vehicle server, first shift data for a first plurality of vehicles. The first shift data may include a plurality of first time periods, where each first time period corresponds to a window of time that a vehicle of the first plurality of vehicles is available for execution of orders in a first geographical area. The method may also include receiving, from a second vehicle server, second shift data for a second plurality of vehicles. The second shift data may include a plurality of second time periods, where each second time period corresponds to a window of time that a vehicle of the second plurality of vehicles is available for execution of orders in the second geographical area.

The method may also include receiving, from a user terminal, a selected time slot for a requested order at a requested order location in the second geographical area. The method may further include determining a second time period of the plurality of second time periods that at least partially coincides in time with the selected time slot, and determining a first time period of the plurality of first time periods based on a start time of the determined second time period.

The method may further include transmitting, to a first vehicle server, a first order assignment for the requested order from a pick-up location in the first geographical area to a drop-off location in the second geographical area during the determined first time period, and transmitting, to a second vehicle server, a second order assignment for the requested order from the drop-off location in the second geographical area to the requested order location in the second geographical area during the determined second time period, In yet other embodiments, a non-transitory computer readable medium has instructions stored thereon, where the instructions, when executed by at least one processor, cause a device to perform operations that include receiving, from a first vehicle server, first shift data for a first plurality of vehicles. The first shift data includes a plurality of first time periods, where each first time period corresponds to a window of time that a vehicle of the first plurality of vehicles is available for execution of orders in a first geographical area. The operations may also include receiving, from a second vehicle server, second shift data for a second plurality of vehicles. The second shift data includes a plurality of second time periods, where each second time period corresponds to a window of time that a vehicle of the second plurality of vehicles is available for execution of orders in the second geographical area. The operations may further include receiving, from a user terminal, a selected time slot for a requested order at a requested order location in the second geographical area;

In some embodiments, a system for optimizing vehicle resources during delivery of goods is disclosed. The system may include a computing device configured to communicate with a vehicle server, wherein the vehicle server is configured to communicatively couple to a plurality of vehicles. The computing device may be configured to receive, from the vehicle server, time data of the plurality of vehicles, wherein the time data includes a plurality of time slots for each of the plurality of vehicles that are used for a plurality of deliveries and determine at least one available time slot among the plurality of time slots and communicate the at least one available time slot to at least one user terminal. The computing device may be configured to receive, from the at least one user terminal, at least one delivery order indicating at least one selected time slot from the at least one available time slot.

In response to receiving the at least one delivery order indicating the at least one selected time slot, the computing device may further be configured to determine a delivery time (e.g., a doorstep time) for the at least one order delivery based on applying a machine learning process to data identifying at least one purchase order feature associated with the at least one order delivery. The computing device may be further configured to assign the delivery order to a vehicle from the plurality of vehicles based, at least in part, on the selected time indicated in the at least one delivery order and the determined delivery time. The computing device may be configured to calculate, for the assigned vehicle, an optimized delivery route based, at least in part, on the determined delivery time and transmit the optimized delivery route to the assigned vehicle.

In other embodiments, a method for optimizing vehicle resources during delivery of goods is disclosed. Time data of a plurality of vehicles may be received from a vehicle server, wherein the time data includes a plurality of time slots for each of the plurality of vehicles that are used for a plurality of deliveries and at least one available time slot among the plurality of time slots is determined and communicated to at least one user terminal. At least one delivery order indicating at least one selected time slot may be received from the user terminal. In response to receiving the at least one delivery order indicating the at least one selected time slot, a delivery time may be determined a for the at least one order delivery based on applying a machine learning process to data identifying at least one purchase order feature associated with the at least one order delivery. The delivery order may be assigned to a vehicle from the plurality of vehicles based, at least in part, on the selected time indicated in the at least one delivery order and the determined delivery time. An optimized delivery route for the assigned vehicle may be calculated, based, at least in part, on the determined delivery time, and the optimized delivery route may be transmitted to the assigned vehicle.

In yet other embodiments, a non-transitory computer readable medium is disclosed, having instructions stored thereon for optimizing vehicle resources during delivery of goods. The instructions, when executed by a processor, cause a device to perform operations for such optimization. The device may communicate with a vehicle server, wherein the vehicle server is configured to communicatively couple to a plurality of vehicles. The device may receive, from the vehicle server, time data of the plurality of vehicles, wherein the time data includes a plurality of time slots for each of the plurality of vehicles that are used for a plurality of deliveries and determine at least one available time slot among the plurality of time slots and communicate the at least one available time slot to at least one user terminal. The device may receive, from the at least one user terminal, at least one delivery order indicating at least one selected time slot from the at least one available time slot.

In response to receiving the at least one delivery order indicating the at least one selected time slot, the device may determine a delivery time for the at least one order delivery based on applying a machine learning process to data identifying at least one purchase order feature associated with the at least one order delivery. The device may assign the delivery order to a vehicle from the plurality of vehicles based, at least in part, on the selected time indicated in the at least one delivery order and the determined delivery time. The device may calculate, for the assigned vehicle, an optimized delivery route based, at least in part, on the determined delivery time and transmit the optimized delivery route to the assigned vehicle.

BRIEF DESCRIPTION OF THE DRAWINGS

FIG. 13 illustrates an exemplary list of purchase order features that may be used by the exemplary computing device shown in FIG. 11, in accordance with some embodiments of the present disclosure.

DETAILED DESCRIPTION

As discussed above, existing solutions or systems for resource optimization cannot scale to handle large numbers of orders and do not enable sufficient flexibility with computational resources. The embodiments described herein facilitate the efficient optimization of resources in large-scale delivery systems. The embodiments described herein include, for example, the estimation of a number of available time windows for a delivery, and the presenting of available time windows to a user. The embodiments also include the determination of delivery routes for one or more vehicles and the subsequent optimization of the determined delivery routes. Although the embodiments described herein illustrate delivery resource optimization systems and methods used for the delivery of grocery goods or items, the embodiments discussed herein are not limited to such systems and methods and one of ordinary skill in the art will appreciate that the current disclosure may be used in connection with any type of system or method that addresses various different types of combinatorial optimization problems.

Figure 1A:
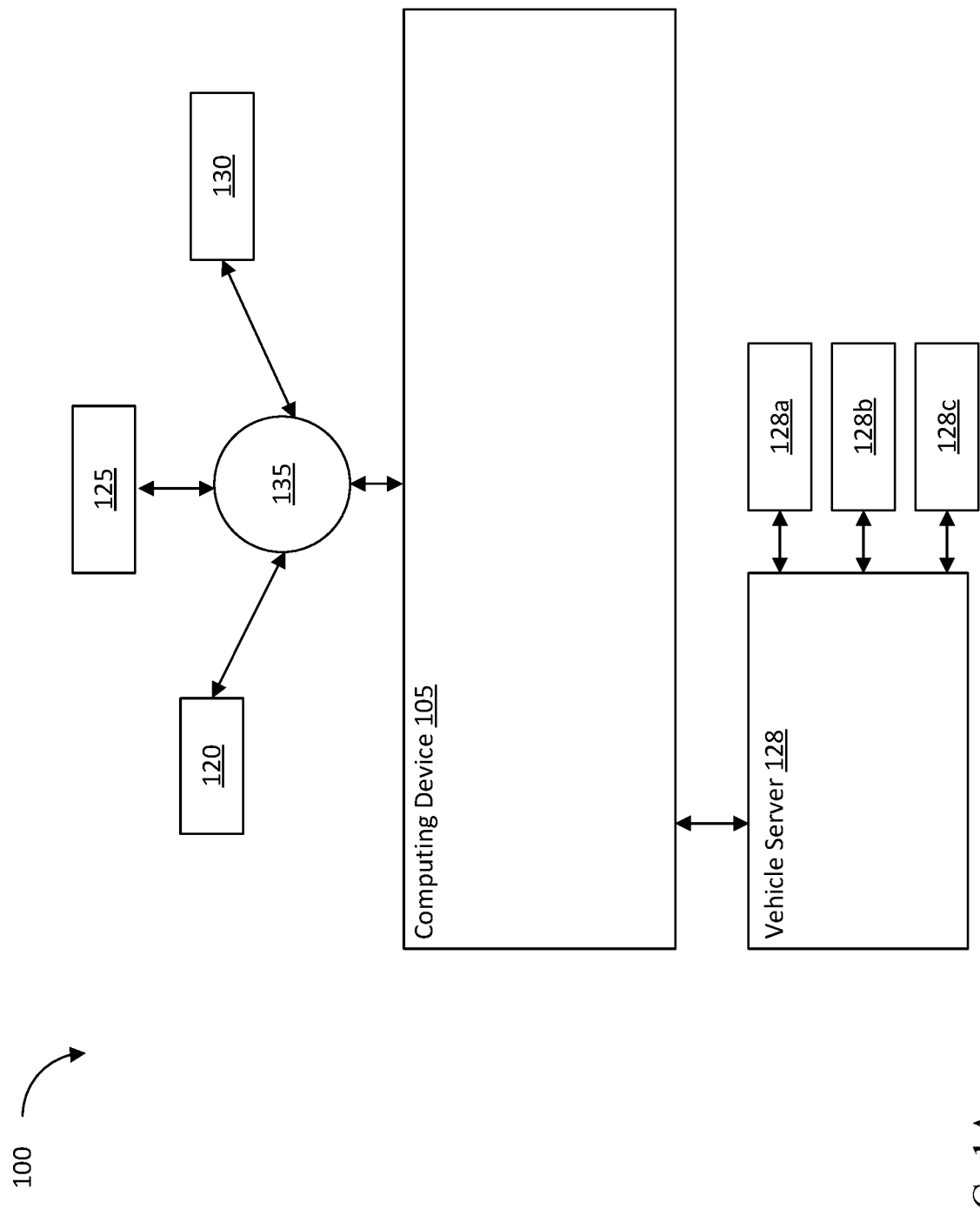
FIG. 1A illustrates an exemplary system in accordance with some embodiments of the present disclosure.

FIG. 1A illustrates a system 100 in accordance with exemplary embodiments of the present disclosure. System 100 may be utilized, for example, in optimizing the use of a plurality of vehicles (not shown) in delivering groceries to users. System 100 may include a server 105, one or more user terminals, such as terminals 120, 125, and 130, and a vehicle server 128, that are each coupled to server 105. System 100 may further include vehicles 128a-c which are each communicatively coupled to vehicle server 128 and may receive delivery order assignments and delivery routes from server 105 via the vehicle server 128. It should be noted that, as used herein, the term "couple" is not limited to a direct mechanical, communicative, and/or an electrical connection between components, but may also include an indirect mechanical, communicative, and/or electrical connection between two or more components or a coupling that is operative through intermediate elements or spaces.

Server 105, user terminals 120, 125, and 130, and vehicle server 128 can each be a computing device that can be, for example, a desktop computer, laptop, mobile device, tablet, thin client, or other device having a communications interface (not shown) that can communicate with other components of system 100, as explained in more detail below with respect to FIG. 1B.

In some embodiments, server 105 can be associated with, for example, a retail store, such as a grocery store. For example, server 105 can include information about the grocery items that are available from the retail store. For example, server 105 can maintain a database (such as database 160 shown in FIG. 1B) that includes details on the various grocery items available from the retail store, the quantity of each item available from the retail store, the price of each item, and (if applicable) an amount of time before a particular grocery item will perish after leaving the store (e.g. milk or fresh fruits). As will be discussed in further detail with respect to FIG. 2, server 105 may also maintain a database of vehicle availability which it may use to determine available time slots from the plurality of vehicles for presentation to a user (e.g. via user terminals 120, 125, and 130).

In some embodiments, vehicle server 128 may enable communication between server 105 and each of the vehicles 128a-c. For example, as server 105 determines delivery order assignments and delivery routes (as discussed in more detail below), server 105 may communicate these assignments and routes to vehicle server 128, which may in turn communicate the assignments and routes to the corresponding vehicle. Vehicle server 128 may also transmit to server 105, information regarding the plurality of time slots each of the vehicles in the plurality of vehicles has. For example, vehicle server 128 may transmit information regarding the number of time slots a vehicle has per delivery route, the length of each time slot, and other pertinent information regarding the plurality of time slots each vehicle has. In some embodiments, the functions of the vehicle server 128 may be performed by server 105.

In some embodiments, each user terminal 120, 125, and 130, can be accessed by a user to enable the user to communicate with server 105. For example, each user terminal 120, 125, and 130 can be capable of connecting to, for example, the internet and communicating with server 105 via network 135. The user can use terminals 120, 125, and 130 for accessing information from server 105. For example, the user can obtain information, such as the grocery items that are available for purchase and available delivery time slots, as discussed in more detail herein.

During operation, as explained in more detail below with respect to FIGS. 1A, 2, 3A, 3B, 4A, 4B, and 5, system 100 can be used to facilitate the efficient delivery of goods, such as grocery items. For example, server 105 may receive delivery orders from user terminals 120-130 via network 135. Such orders may be received from a variety of locations. As discussed above, although discussed in terms of grocery delivery, the embodiments described herein may be utilized to solve any combinatorial optimization problem. Upon receiving a delivery order from any of user terminals 120-130, server 105 may assign the delivery order to an appropriate vehicle among the plurality of vehicles 128a-c and determine an appropriate delivery route for that vehicle based on one or more delivery parameters. Server 105 may transmit the assignment and route information to the appropriate delivery vehicle via vehicle server 128.

Figure 1B:
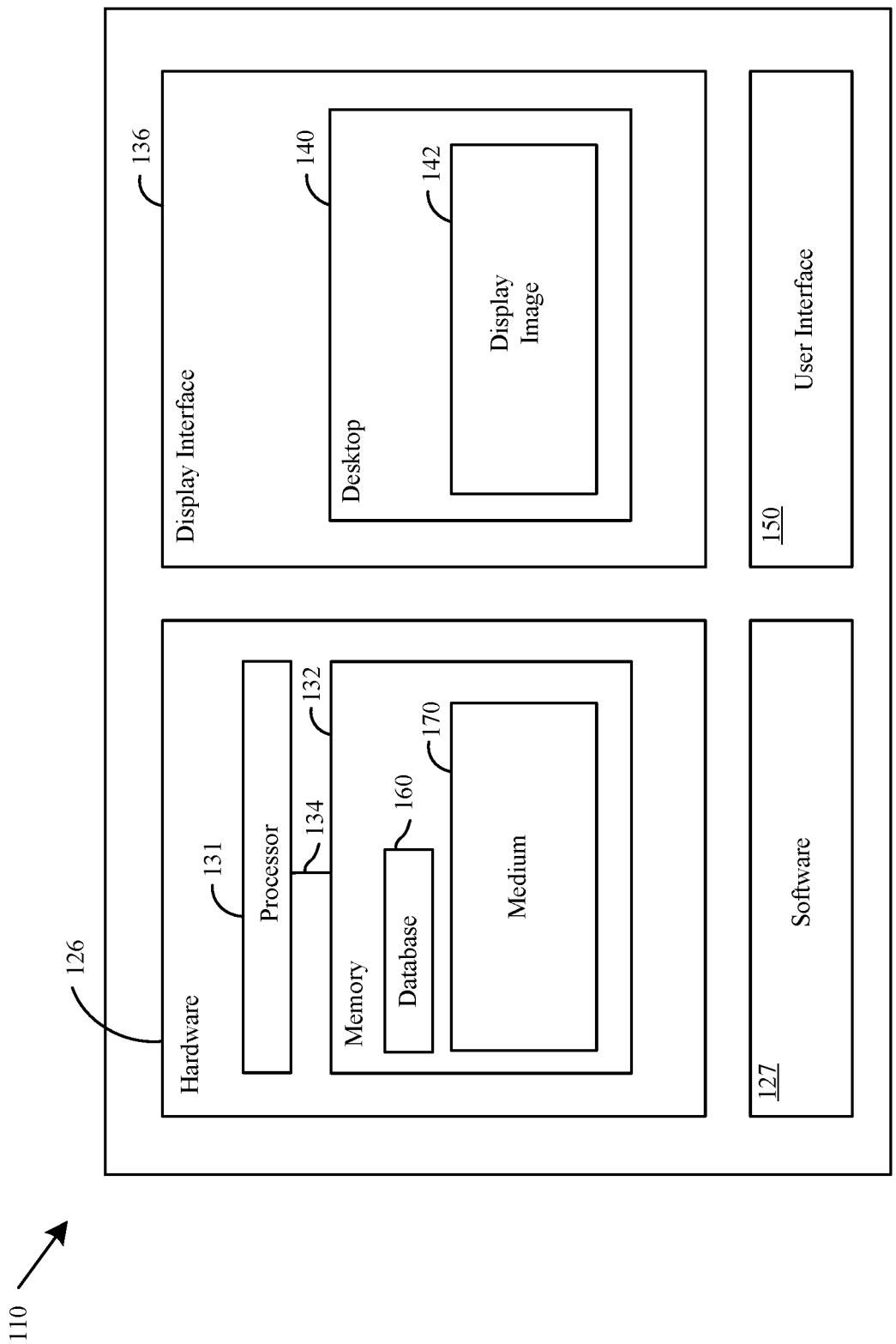
FIG. 1B illustrates an exemplary computing device that may be used with the system shown in FIG. 1A, in accordance with some embodiments of the present disclosure.

FIG. 1B is a block diagram of an exemplary computing device 110, which may be used to implement one or more of server 105, user terminals 120, 125, and 130, and vehicle server 128 (shown in FIG. 1A). In some embodiments, computing device 110 includes a hardware unit 126 and software 127. Software 127 can run on hardware unit 126 such that various applications or programs can be executed on hardware unit 126 by way of software 127. In some embodiments, the functions of software 127 can be implemented directly in hardware unit 126, e.g., as a system-on-a-chip, firmware, field-programmable gate array ("FPGA"), etc. In some embodiments, hardware unit 126 includes one or more processors, such as processor 131. In some embodiments, processor 131 is an execution unit, or "core," on a microprocessor chip. In some embodiments, processor 131 may include a processing unit, such as, without limitation, an integrated circuit ("IC"), an ASIC, a microcomputer, a programmable logic controller ("PLC"), and/or any other programmable circuit. Alternatively, processor 131 may include multiple processing units (e.g., in a multi-core configuration). The above examples are exemplary only, and, thus, are not intended to limit in any way the definition and/or meaning of the term "processor."

Hardware unit 126 also includes a system memory 132 that is coupled to processor 131 via a system bus 234. Memory 132 can be a general volatile RAM. For example, hardware unit 126 can include a 32 bit microcomputer with 2 Mbit ROM and 64 Kbit RANI, and/or a few GB of RAM. Memory 132 can also be a ROM, a network interface (MC), and/or other device(s).

In some embodiments, computing device 110 can also include at least one media output component or display interface 136 for use in presenting information to a user. Display interface 136 can be any component capable of conveying information to a user and may include, without limitation, a display device (not shown) (e.g., a liquid crystal display ("LCD"), an organic light emitting diode ("OLED") display, or an audio output device (e.g., a speaker or headphones)). In some embodiments, computing device 110 can output at least one desktop, such as desktop 140. Desktop 140 can be an interactive user environment provided by an operating system and/or applications running within computing device 110, and can include at least one screen or display image, such as display image 142. Desktop 140 can also accept input from a user in the form of device inputs, such as keyboard and mouse inputs. In some embodiments, desktop 140 can also accept simulated inputs, such as simulated keyboard and mouse inputs. In addition to user input and/or output, desktop 140 can send and receive device data, such as input and/or output for a FLASH memory device local to the user, or to a local printer.

In some embodiments, display image 142 can be presented to a user on computer displays of a remote terminal (not shown). For example, computing device 110 can be connected to one or more remote terminals (not shown) or servers (not shown) via a network (not shown), wherein the network can be the Internet, a local area network ("LAN"), a wide area network ("WAN"), a personal area network ("PAN"), or any combination thereof, and the network can transmit information between computing device 110 and the remote terminals or the servers, such that remote end users can access the information from computing device 110.

In some embodiments, computing device 110 includes an input or a user interface 150 for receiving input from a user. User interface 150 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface. In some embodiments, mobile devices, such as tablets, can be used.

Computing device 110, in some embodiments, can include a database 160 within memory 132, such that various information can be stored within database 160. Alternatively, in some embodiments, database 160 can be included within a remote server (not shown) with file sharing capabilities, such that database 160 can be accessed by computing device 110 and/or remote end users. In some embodiments, a plurality of computer-executable instructions can be stored in memory 132, such as one or more computer-readable storage media 170 (only one being shown in FIG. 1B). Computer storage medium 170 includes non-transitory media and may include volatile and nonvolatile, removable and non-removable mediums implemented in any method or technology for storage of information such as computer-readable instructions, data structures, program modules or other data. The instructions may be executed by processor 131 to perform various functions described herein, e.g., steps of the method shown in FIG. 5.

Figure 1C:
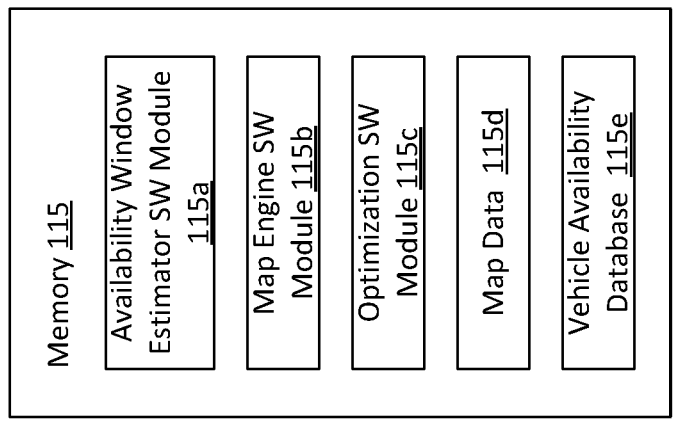
FIG. 1C illustrates an exemplary memory for storing instructions for executing steps of a method that may be used with the system shown in FIG. 1A, in accordance with some embodiments of the present disclosure.

FIG. 1C illustrates an example of computer-executable instructions that can be stored in memory 132 as software (SW) modules. Memory 132 may include the following SW modules: (1) an availability window estimator SW module 132a that is configured to determine a number of available time slots for delivery of groceries; (2); a map engine SW module 132b that is configured to assign delivery orders to vehicles and determine the sequence in which a particular vehicles orders will be delivered (delivery route); (3) an optimization SW module 132c that is configured to optimize the delivery route for each vehicle having at least one delivery order assigned to it.

Memory 132 may further store map data 132d of the geographic area serviced by one or more store fronts as well as a vehicle availability database 132e that stores a snapshot of the current capacity of each vehicle in the plurality of vehicles and the time slots each vehicle has available.

Referring back to FIG. 1A, in some embodiments, server 105 may determine and present a number of available delivery time slots to a user. More specifically, server 105 may generate a synthetic order and compare the synthetic order to a snap shot of the plurality of vehicles (as described below with respect to FIG. 2) retrieved from vehicle availability database 132e (shown in FIG. 1C). Server 105 may maintain the snap shot based on information received from vehicle server 128 regarding the plurality of time slots each vehicle in the plurality of vehicles has. For example, vehicle server 128 may transmit information regarding the number of time slots each vehicle has, and the length of each time slot. Server 105 may determine which vehicles among the plurality of vehicles has sufficient capacity to accommodate the synthetic order. Upon determining which vehicles have sufficient capacity, server 105 may insert the synthetic order into each time slot in each of the vehicles having sufficient capacity. For each time slot the synthetic order is inserted into, server 105 may determine whether the insertion is feasible. In other words, server 105 may determine if all of the vehicle's other delivery orders can be met (e.g. delivered on time) if the synthetic order is inserted into that time slot and remove those time slots that would result in the vehicle being unable to fulfill one or more of its previously scheduled deliveries. For example, server 105 may determine whether the additional time required to deliver the synthetic order, including any additional delivery time (e.g., doorstep time, discussed further below) associated with delivering the synthetic order, will prevent completing any previously scheduled deliveries on time. At this point, server 105 may identify the time slots having at least one of the plurality of vehicles available for delivery during that time slot as acceptable delivery time slots and communicate those time slots to the user via user terminals 120-130.

Figure 2:
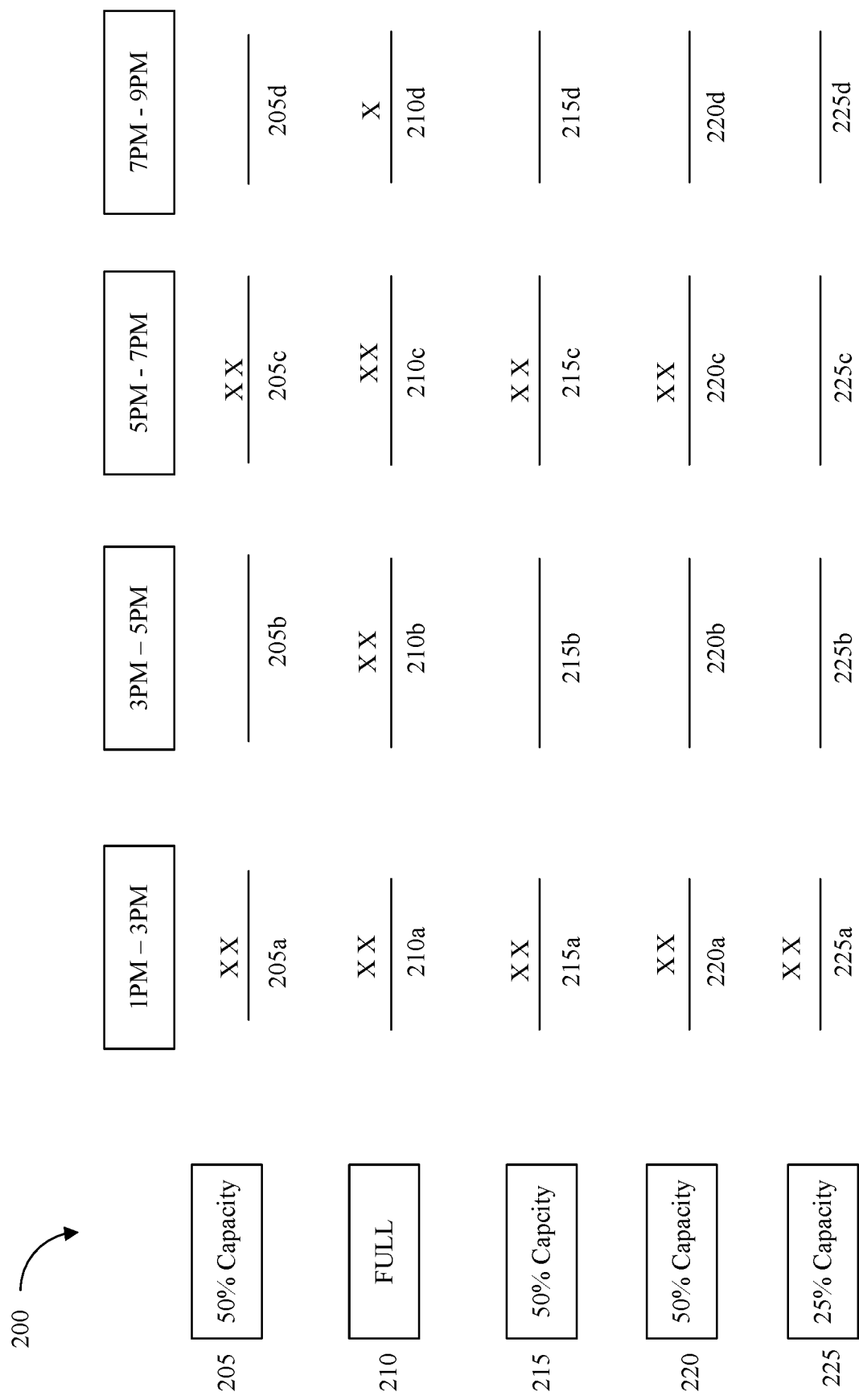
FIG. 2 illustrates an exemplary diagram of vehicle availability that may be used with the system shown in FIG. 1A, in accordance with some embodiments of the present disclosure.

FIG. 2 illustrates a snapshot 200 of the time slot availability of a plurality of vehicles. Snapshot 200 may be updated at the end of an optimization process (as discussed in further detail below) and stored in vehicle availability database 132e (shown in FIG. 1C). Each vehicle 205, 210, 215, and 220 may have 4 available time slots (ranging from 1 PM to 9 PM). It should be noted that time slots of any appropriate length may be used. As discussed above, the number of time slots each vehicle has, as well as the length of each time slot may be determined based on information transmitted from each vehicle 128a-c via vehicle server 128. As shown in FIG. 2, vehicle 205 has time slots 205a-d while vehicle 210 has time slots 210a-d etc. In the example of FIG. 2, vehicle 210 may not have any capacity, thus server 105 may refrain from assigning any further delivery orders to it. In addition, none of the vehicles 205-225 may have availability in the 1 PM-3 PM time slot, while only vehicle 225 has availability in the 5 PM-7 PM time slot, corresponding to time slot 225c. Thus, in the example of FIG. 2, server 105 may present three time slots (3 PM-5 PM, 5 PM-7 PM, and 7 PM-9 PM) to a customer wishing to place a delivery order.

Referring back to FIG. 1A, upon receiving a delivery order indicating a delivery address and a selected time slot, server 105 may determine a delivery route for one or more vehicles in the plurality of vehicles. More specifically, server 105 may determine which vehicle the received delivery order is to be assigned to, whether certain delivery orders need to be re-assigned to a different vehicle in order to optimize vehicle resources, and the sequence in which each vehicle's assigned delivery orders will be delivered. Server 105 may assign the received delivery order to, and determine a delivery route for a vehicle from the plurality based on the selected time slot of the received order, map data 115d, and an overall cost that is a function of a number of delivery parameters. In some embodiments, server 105 may also re-assign delivery orders to, and determine delivery routes for other vehicles in the plurality of vehicles based on the selected time slot of the received order, map data 115d, and an overall cost that is a function of a number of delivery parameters. Examples of such delivery parameters may include number of vehicles from the plurality needed to deliver all orders, total number of miles driven by the vehicles during delivery, total driving time of the vehicles during delivery (e.g., including, in some examples, delivery times for each delivery), total amount of idle time of the vehicles during delivery, and degree of lateness in delivering an order (if any) among others. Server 105 may utilize a meta-heuristic algorithm, such as simulated annealing, in order to determine which vehicle the received delivery order is to be assigned to, as well as the sequence in which that vehicle's delivery orders are to be delivered. In addition, server 105 may utilize the meta heuristic algorithm to determine whether certain delivery orders need to be re-assigned to a different vehicle in order to optimize vehicle resources, and the sequence in which each vehicle's assigned delivery orders will be delivered (delivery route). In some embodiments, server 105 may assign a particular weight to each delivery parameter when assigning delivery orders and determining delivery routes for the one or more vehicles. For example, server 105 may assign total mileage the largest weight, and thus may assign delivery orders to and determine delivery routes for the one or more vehicles from the plurality of vehicles based primarily on reducing the total miles driven by the one or more vehicles, as this will have the largest impact on the overall cost. In this way, server 105 may determine one or more delivery routes.

Figure 3B:
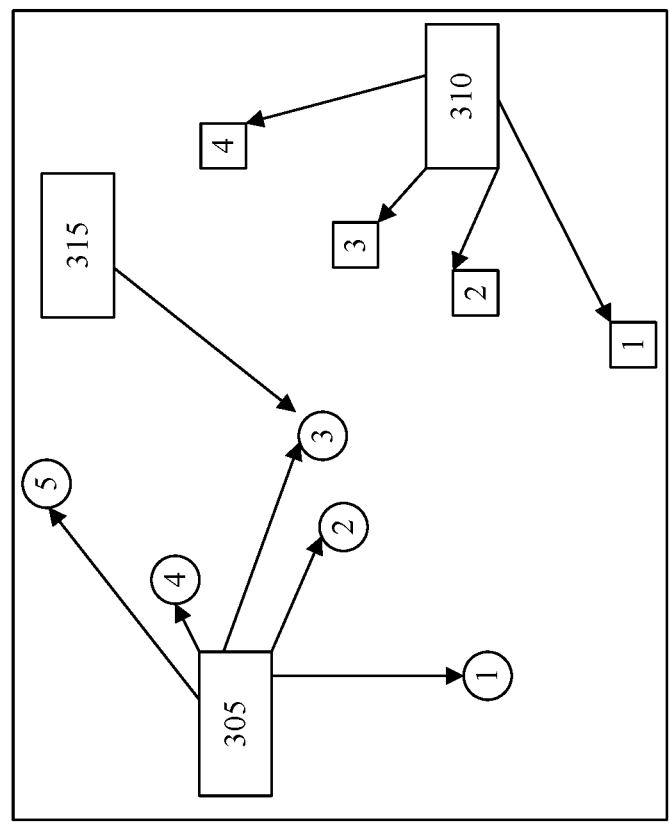
FIG. 3B illustrates an exemplary diagram of the route map for one or more delivery vehicles after assigning the delivery route that may be used with the system shown in FIG. 1A, in accordance with some embodiments of the present disclosure.
Figure 3A:
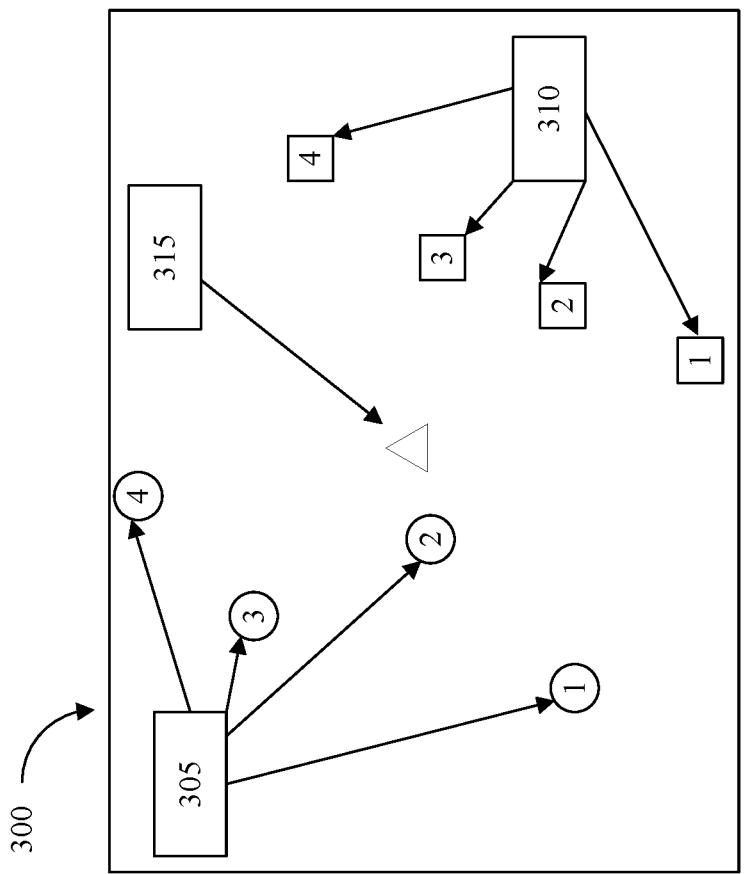
FIG. 3A illustrates an exemplary diagram of a route map for one or more delivery vehicles prior to assigning a delivery route or option that may be used with the system shown in FIG. 1A, in accordance with some embodiments of the present disclosure.

FIG. 3A illustrates a delivery route map 300 for a first and second delivery vehicle in accordance with some embodiments of the present disclosure. Delivery route 305 may indicate the delivery route of the first vehicle, while delivery route 310 may indicate the delivery route of the second vehicle. Delivery order 315 may indicate the delivery address of a delivery order that is yet to be assigned to a particular vehicle. As an initial matter, server 105 may determine that assigning delivery order 315 to the first delivery vehicle for delivery in the same time slot as delivery number 2 will not prevent the first delivery vehicle from completing any of its subsequent deliveries on time. For example, server 105 may determine whether the additional time required to deliver delivery order 315, including any additional delivery time (discussed further below) associated with delivery order 315, will prevent completing any subsequent deliveries on time. Server 105 may make a similar determination with respect to assigning delivery order 315 to the second delivery vehicle for delivery in the time slot for its delivery number 2. In addition, server 105 may determine that the delivery address of delivery order 315 is in close proximity to the delivery address of delivery number two for the first delivery vehicle and is also relatively far from any of the delivery addresses in the second vehicles delivery route 310. Thus, server 105 may determine that the total number of miles required to be driven will be minimized if delivery order 315 is assigned to the first delivery vehicle for delivery after delivery number 2. Server 105 may also determine that the number of miles driven can be further reduced if the first delivery vehicle delivers delivery order 315 after its current delivery number two (as delivery number two is on the way). Therefore, server 105 may assign delivery order 315 to the first delivery vehicle, and sequence it for delivery right after delivery number 2. FIG. 3B illustrates the new delivery route for the first delivery vehicle.

In some embodiments, server 105 may determine a delivery time for delivering an order. The delivery time, which may be known as a doorstep time, may be the time difference between when a driver of a vehicle leaves the vehicle, after arriving at a delivery destination, to deliver the order, and when the driver re-enters the vehicle. For example, when a vehicle arrives at the delivery address of delivery order 315, the driver of the vehicle may exit the vehicle, unload the purchased goods associated with delivery order 315 from the vehicle, and transport them to, for example, the front door of the delivery address. After delivering the purchased goods, the driver may walk back to the vehicle, enter the vehicle, and continue on the delivery route. The difference in time from when the driver exited the vehicle, to the time he re-entered the vehicle, is the delivery time for that delivery (e.g., delivery time=vehicle arrival time at a destination—vehicle departure time from the destination).

More accurate estimations of the delivery time for future order deliveries results in more accurate route and time slot scheduling, and thus may reduce delivery costs (e.g., vehicle fuel, delivery time). Server 105 may attempt to estimate the delivery time for an order delivery to determine how long a delivery may take. In some examples, server 105 estimates the delivery time for a delivery by applying one or more machine learning processes (e.g., models) to one or more purchase order features associated with the delivery, as discussed below. The machine learning processes may include, but are not limited to, ordinary least squares regression, ridge regression, support vector regression (SVRs), such as SVR using a linear kernel, random forest, XGBoost, or any other suitable machine learning process. As further discussed below, the purchase order features may include, but are not limited to, item based features, shipping source features, time and geo based features, delivery destination based features, or any other suitable purchase order features. For example, the purchase order features may include one or more of the purchase order features identified in FIG. 13.

In some embodiments, server 105 may further optimize each vehicle's delivery route. Server 105 may utilize any suitable local search algorithm, such as 1-0 exchange in order to calculate an optimized delivery route for each vehicle. Server 105 may randomly select a delivery order from among the plurality of delivery routes, and iteratively insert the randomly selected delivery order into one or more randomly selected time slots from the plurality of delivery routes. Server 105 may then determine the cost effect of each insertion. In some embodiments, server 105 may insert the randomly selected delivery order into every time slot from the plurality of delivery routes and calculate the cost effect of every insertion. In still other embodiments, server 105 may determine which routes among the plurality of delivery routes have available time slots that overlap with the time slot of the randomly selected delivery order. Server 105 may only insert the randomly selected delivery order into those routes having an available time slot that overlaps with the time slot of the randomly selected delivery order. Server 105 may insert the randomly selected delivery order into the time slot resulting in the largest reduction in overall cost. In some embodiments, server 105 may perform multiple iterations of the above described process to further optimize each vehicle's delivery route.

Figure 4A:
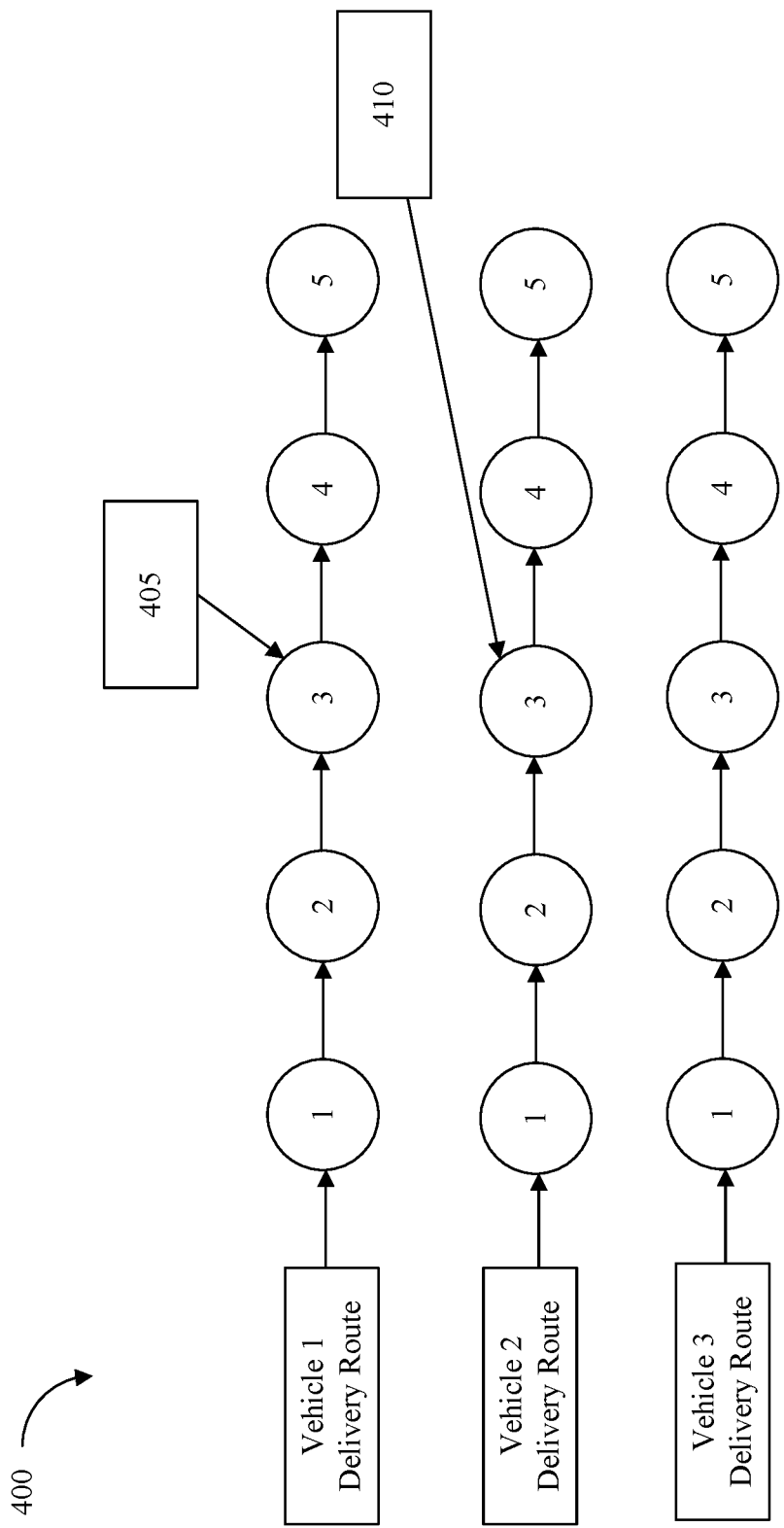
FIG. 4A illustrates an exemplary diagram of a plurality of delivery routes prior to optimization that may be used with the system shown in FIG. 1A, in accordance with some embodiments of the present disclosure.
Figure 4B:
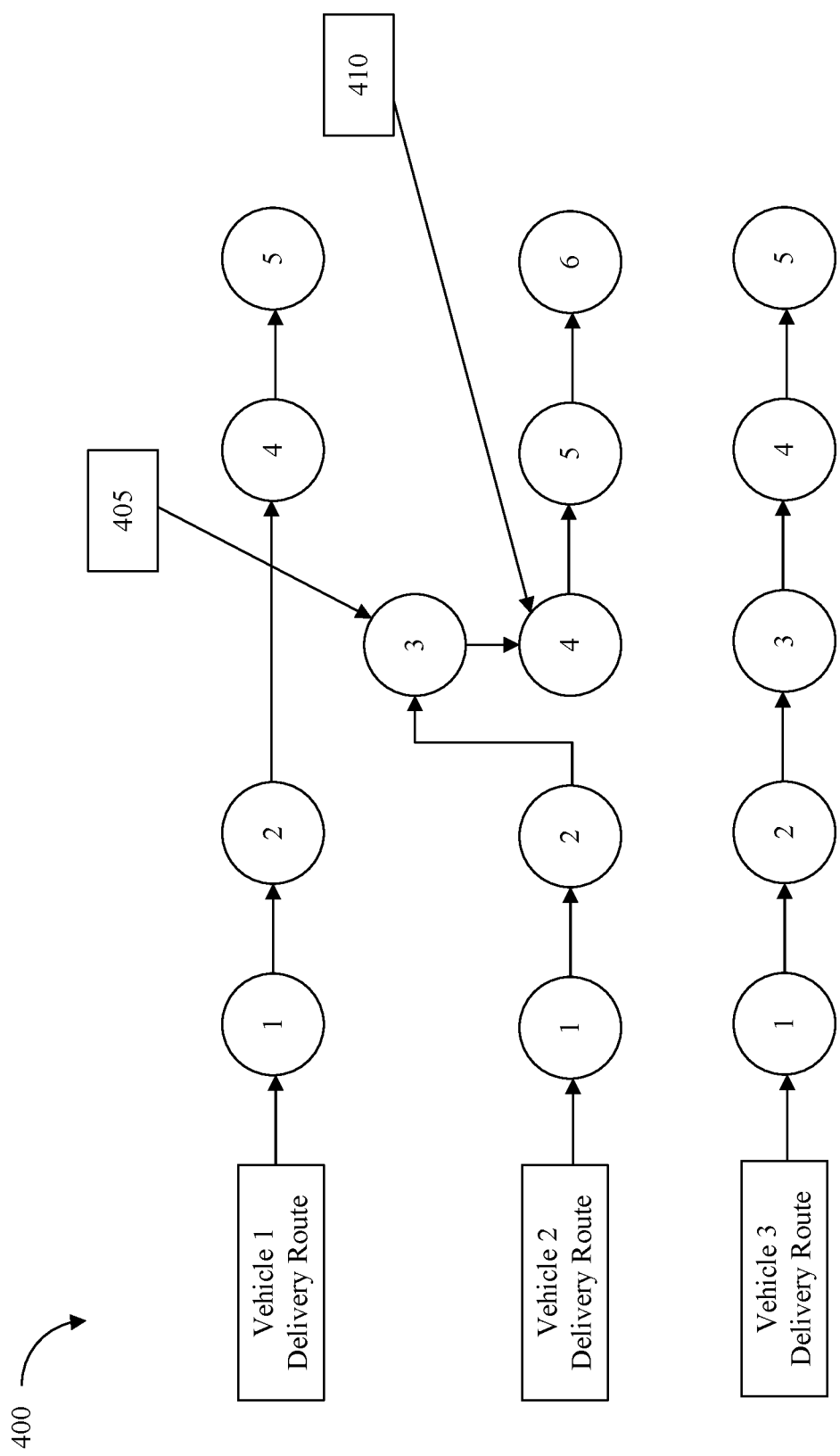
FIG. 4B illustrates an exemplary diagram of the plurality of delivery routes during optimization that may be used with the system shown in FIG. 1A, in accordance with some embodiments of the present disclosure.

FIG. 4A illustrates delivery routes for three vehicles. Server 105 may randomly select delivery order 405 corresponding to delivery number 3 in vehicle one's delivery route. Server 105 may then randomly select the time slot of delivery order 410 corresponding to delivery number 3 in vehicle two's delivery route and insert delivery order 405 into the time slot containing delivery order 410. FIG. 4B illustrates the updated delivery routes after the insertion by server 105. Server 105 may calculate the cost effect of inserting delivery order 405 into delivery order 410's slot as illustrated in FIG. 4B. More specifically, server 105 may determine the cost effect based on an increase or decrease (if any) in the total number of miles driven by each vehicle during delivery, total driving time for each vehicle during delivery, total amount of idle time for each vehicle during delivery, number of trucks needed to deliver all orders, and degree of lateness (if any) based on inserting delivery order 405 into delivery order 410's time slot. As discussed above, in some embodiments, certain factors (e.g. total mileage, degree of lateness) may have been assigned a greater weight, and therefore even relatively small increases in those factors may result in a significantly larger overall cost. Server 105 may iteratively insert delivery order 405 into one or more random time slots and calculate the cost effect of each such insertion. Server 105 may reassign delivery order 405 to the time slot resulting in the largest reduction in overall cost. If no time slot would result in a reduction of overall cost, server 105 may refrain from reassigning delivery order 405.

Referring back to FIG. 1, in some embodiments, server 105 may assign degree of lateness a relatively heavy weight, as a late delivery can result in severe consequences (e.g. easily perishable goods going bad). However, a certain degree of lateness may be tolerable if a significant improvement in one or more other parameters is achieved by an insertion. For example, if an improvement in the overall cost due to a relatively large reduction in total mileage driven by all vehicles is achieved, and the degree of lateness will not result in goods of a delivery order perishing, then server 105 may allow the insertion (if the cost effect is superior to the cost effect of other insertions).

In some embodiments, server 105 may generate an updated snapshot of time slot availability for the plurality of vehicles and store the updated snapshot in vehicle availability database 132e for presentation to online users. The updated snap shot may be based on the optimized delivery routes determined for the one or more vehicles in the plurality of vehicles.

As described above, server 105 may assign delivery orders and optimize delivery routes whenever a new delivery order is received from a user terminal 120-135. In some embodiments, server 105 may continuously optimize the delivery routes of each vehicle at pre-defined intervals until a pre-defined time period before the delivery route is to commence. In other embodiments, server 105 may optimize delivery routes in response to receiving a new delivery order until a pre-defined time period before the delivery route is to commence.

In some embodiments, server 105 may transmit the optimized delivery routes to the corresponding vehicles among the plurality of vehicles 128a-c via vehicle server 128, which may act as a relay to provide the optimized delivery routes to the corresponding vehicles.

Figure 5:
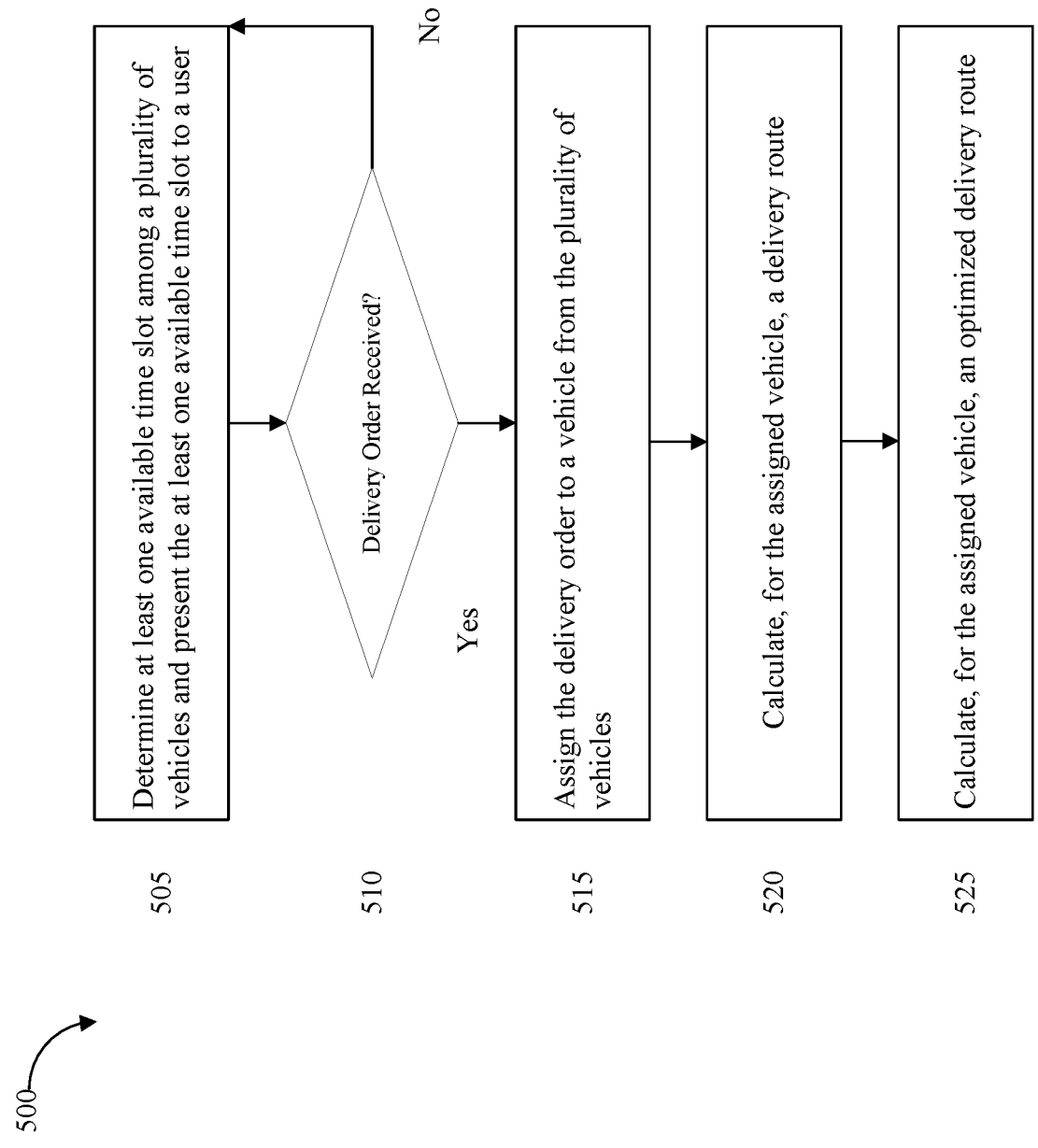
FIG. 5 illustrates a flow diagram of a method for optimizing a plurality of vehicle resources during delivery of goods using the system shown in FIG. 1A, in accordance with some embodiments of the present disclosure.

FIG. 5 illustrates a flow diagram of a method 500 for optimizing delivery vehicle resources in accordance with some exemplary embodiments of the present disclosure. Method 500 may be performed by, server 105 described with respect to FIG. 1, for example.

At 505, server 105 may determine a number of available delivery time slots and present them to a user. More specifically, server 105 may generate a synthetic order and compare the synthetic order to a snap shot of the time slot availability of the plurality of vehicles (as described above with respect to FIG. 2) retrieved from vehicle availability database 132e (shown in FIG. 1C). Server 105 may maintain the snap shot based on information received from vehicle server 128 regarding the plurality of time slots each vehicle in the plurality of vehicles has. For example, vehicle server 128 may transmit information regarding the number of time slots each vehicle has, and the length of each time slot. Server 105 may determine which vehicles among the plurality of vehicles has sufficient capacity to accommodate the synthetic order. Upon determining which vehicles have sufficient capacity, server 105 may insert the synthetic order into each time slot in each of the vehicles having sufficient capacity. For each time slot the synthetic order is inserted into, server 105 may determine whether the insertion is feasible. In other words, server 105 may determine if all of the vehicle's other delivery orders can be met (e.g. delivered on time) if the synthetic order is inserted into that time slot and remove those time slots that would result in the vehicle being unable to fulfill one or more of its previously scheduled deliveries. For example, server 105 may determine whether the additional time required to deliver the synthetic order, including any additional delivery time (discussed further below) associated with delivering the synthetic order, will prevent completing any previously scheduled deliveries on time. At this point, server 105 may identify the time slots having at least one of the plurality of vehicles available for delivery during that time slot as acceptable delivery time slots and present them to the user via user terminals 120-130.

At 510 server 105 may determine whether a delivery order has been received. If server 105 determines that a delivery order has been received, at 515, server 105 may determine which vehicle the received delivery order is to be assigned to, and whether certain delivery orders need to be re-assigned to a different vehicle in order to optimize vehicle resources. At 520, server 105 may determine the sequence in which the assigned vehicle's delivery orders will be delivered. Server 105 may assign delivery orders to, and determine a delivery route for the vehicle based on the selected time slot of the received order, map data 132d, and an overall cost that is a function of a number of delivery parameters. In some embodiments, server 105 may also re-assign delivery orders to and determine delivery routes for other vehicles in the plurality of vehicles based on the selected time slot of the received order, map data 132d, and an overall cost that is a function of a number of delivery parameters. Examples of such delivery parameters may include number of vehicles from the plurality needed to deliver all orders, total number of miles driven by the vehicles during delivery, total driving time of the vehicles during delivery, total amount of idle time of the vehicles during delivery, and degree of lateness in delivering an order (if any) among others. Server 105 may utilize a meta-heuristic algorithm, such as simulated annealing, in order to determine which vehicle the received delivery order is to be assigned to, as well as the sequence in which that vehicle's delivery orders are to be delivered. In addition, server 105 may utilize the meta heuristic algorithm to determine whether certain delivery orders need to be re-assigned to a different vehicle in order to optimize vehicle resources, and the sequence in which each vehicle's assigned delivery orders will be delivered (delivery route). In some embodiments, server 105 may assign a particular weight to each delivery parameter when assigning delivery orders and determining delivery routes for the one or more vehicles. For example, server 105 may assign total mileage the largest weight, and thus may assign delivery orders to and determine delivery routes for the one or more vehicles from the plurality of vehicles based primarily on reducing the total miles driven by the one or more vehicles, as this will have the largest impact on the overall cost. In this way, server 105 may determine one or more delivery routes.

At 525, server 105 may further optimize each vehicle's delivery route. Server 105 may utilize any suitable local search algorithm, such as 1-0 exchange in order to calculate an optimized delivery route for each vehicle. Server 105 may utilize any suitable local search algorithm, such as 1-0 exchange in order to calculate an optimized delivery route for each vehicle. Server 105 may randomly select a delivery order from among the plurality of delivery routes, and iteratively insert the randomly selected delivery order into one or more randomly selected time slots from the plurality of delivery routes. Server 105 may then determine the cost effect of each insertion. In some embodiments, server 105 may insert the randomly selected delivery order into every time slot from the plurality of delivery routes and calculate the cost effect of every insertion. In still other embodiments, server 105 may determine which routes among the plurality of delivery routes have available time slots that overlap with the time slot of the randomly selected delivery order Server 105 may only insert the randomly selected delivery order into those routes having an available time slot that overlaps with the time slot of the randomly selected delivery order. Server 105 may insert the randomly selected delivery order into the time slot resulting in the largest reduction in overall cost. In some embodiments, server 105 may perform multiple iterations of the above described process.

In some embodiments, server 105 may generate an updated snapshot of time slot availability for the plurality of vehicles and store the updated snapshot in vehicle availability database 132e for presentation to online users. The updated snap shot may be based on the optimized delivery routes determined for the one or more vehicles in the plurality of vehicles.

As described above, server 105 may assign delivery orders and optimize delivery routes whenever a new delivery order is received from a user terminal 120-135. In some embodiments, server 105 may continuously optimize the delivery routes of each vehicle at pre-defined intervals until a pre-defined time period before the delivery route is to commence. In other embodiments, server 105 may optimize delivery routes in response to receiving a new delivery order until a pre-defined time period before the delivery route is to commence.

In some embodiments, server 105 may transmit the optimized delivery routes to the corresponding vehicles among the plurality of vehicles 128a-c via vehicle server 128, which may act as a relay to provide the optimized delivery routes to the corresponding vehicles.

In some embodiments, a delivery system may include a hierarchical distribution architecture that includes one or more hubs and one or more spokes. Hubs, for example, may be a distribution center or supercenter that stores goods for order fulfillment. Spokes may be, for example, more locally centralized distribution centers that can store orders received from a hub. The spokes may hold order contents for delivery to customer locations, such as to customer homes. By incorporating one or more spokes to the delivery system, a delivery area served by a hub may be expanded. For example, vehicles, such as vans, can deliver orders from hubs to spokes, and then other vehicles can deliver the orders from the spokes to their delivery destination.

Figure 6:
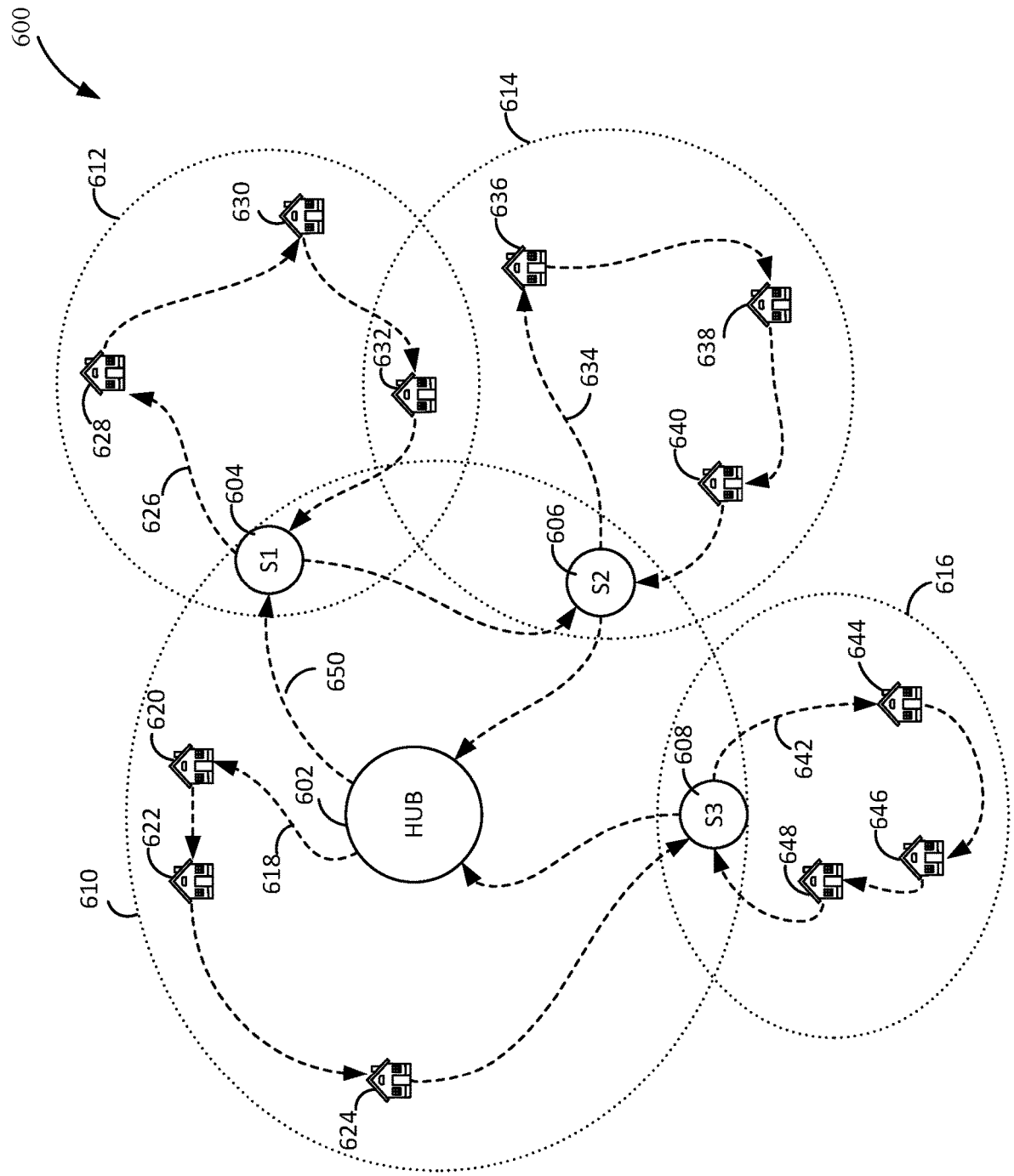
FIG. 6 illustrates an exemplary diagram of a route map for one or more delivery vehicles in a hierarchical distribution design that may be used with the system shown in FIG. 1A, in accordance with some embodiments of the present disclosure.

For example, FIG. 6 illustrates an example delivery system 600 that includes a hub 602, and spokes 604, 606, 608. Hub 602 may be a supercenter that fulfills customer orders, and spokes 604, 606, 608 may be warehouses that can store orders, for example. As indicated in FIG. 6, hub 602 may serve (e.g., deliver to or pick up from) an area (e.g., catchment) 610. For example, the delivery system 600 may include vehicles that are associated with hub 602 and serve locations within area 610. Similarly, spoke 604 may serve area 612, spoke 606 may serve area 614, and spoke 608 may serve area 616.

FIG. 6 also illustrates various customer locations. For example, area 610 includes customer locations 620, 622, and 624. A vehicle, for example, may deliver an order from hub 602 to one or more of customer locations 620, 622, and 624. Similarly, a vehicle may pick up an order from one or more of customer locations 620, 622, and 624 for delivery to hub 602. For example, as indicated by route 618, a vehicle may leave hub 602 and stop first at customer location 620. The vehicle may execute (e.g., deliver or pick up) an order first at customer location 620. The vehicle may then continue to customer location 622 to execute a second order, and then leave customer location 622 and continue to customer location 624 to execute a third order. The vehicle may make proceed to spoke 608 before returning to hub 602. If the vehicle is delivering orders to any of customer locations 620, 622, and 624, the vehicle would be loaded with the order contents before leaving hub 602. If the vehicle is picking up an order from any of customer locations 620, 622, and 624, the contents of the order may be picked up at the respective customer location 620, 622, 624 and unloaded at hub 602 when the vehicle returns to hub 602.

In addition, vehicles associated with hub 602 may serve spokes 604, 606, 608. For example, a vehicle may deliver orders to, or pick up orders from, spokes 604, 606, 608. As indicated in the illustration, a vehicle may follow route 650 which may start at hub 602, and continue on to each of spokes 604 and 606 before returning to hub 602. As indicated earlier, route 618 may include a stop at spoke 608. As such, order contents may be delivered between hub 602 and one or more of spokes 604, 606, 608.

Area 612, which is served by spoke 604, may include one or more customer locations 628, 630, and 632. As indicated by route 626, a vehicle may execute orders at one or more of customer locations 628, 630, and 632. For example, beginning at spoke 604, a vehicle following route 626 may execute an order at customer location 628, continue to customer location 630 to execute another order, and then proceed to customer location 632 to execute a third order. The vehicle may then return to spoke 604. If the vehicle is delivering goods to any of customer locations 628, 630, 632, the vehicle may be loaded with the goods at spoke 604 before proceeding on route 626. Otherwise, if the vehicle is picking up an order from any of customer locations 628, 630, 632, the vehicle may pick up the order from the customer location and deliver it to spoke 604 upon the vehicle's return.

For example, a customer may place an order for a delivery to customer location 630. The order may be fulfilled at hub 602. The order contents may be loaded onto a vehicle, and delivered to spoke 604 via route 650. Upon arriving at spoke 604, the contents may be unloaded and stored within spoke 604. The order contents may then be loaded onto a different vehicle that delivers along route 626. The vehicle would leave spoke 604 following route 626 and, upon arriving at customer location 630, deliver the contents.

Similarly, a vehicle may pick up an order from a customer location for delivery back to hub 602, for example, such as a return. For example, a first vehicle would pick up the contents of the order at the customer location, such as customer location 630, and proceed along route 626 until arriving at spoke 604. Once the vehicle arrives at spoke 604, the contents may be unloaded and stored at spoke 604. To deliver the contents to hub 602, the contents may be loaded on a vehicle assigned to route 650. Upon reaching hub 602, the contents of the order may be unloaded and stored at hub 602.

Area 614, which is served by spoke 606, may include one or more customer locations 632, 636, 638, and 640. A vehicle following route 634 may execute orders at one or more of customer locations 636, 638, and 640. For example, begging at spoke 606, a vehicle following route 634 may execute an order at customer location 636, continue to customer location 638 to execute a second order, and then proceed to customer location 640 to execute a third order.

The vehicle may then return to spoke 606. If the vehicle is delivering goods to any of customer locations 636, 638, and 640, the vehicle may be loaded with the goods at spoke 606 before proceeding on route 634. Otherwise, if the vehicle is picking up an order from any of customer locations 636, 638, 640, the vehicle may pick up the order from the customer location and deliver it to spoke 606 upon the vehicle's return.

Although customer location 632 is in area 614, it is also in area 612. In some examples, a customer location is served by a particular spoke. In this example, customer location 632 is served by spoke 604 as discussed above. In some examples, the areas are based on postal code. For example, if spoke 604 is assigned to serve customer locations within postal code 90001, spoke 606 is assigned to serve customer locations within postal code 90002, and customer location 632 is located within postal code 90001, only spoke 604 will serve customer location 632. In some examples, the serving spoke is based on distance to a customer location. For example, if a service area of spoke 604 overlaps with a service area of spoke 606 at customer location 632, the spoke closest to the customer location 632 will serve customer location 632. For example, if customer location 632 is two miles away from spoke 604, and three miles away from spoke 606, then only spoke 604 will serve customer location 632. However, in other examples, a customer location may be served my multiple spokes. For example, customer location 632 may be served by both spokes 604 and 606.

Because spoke 606 is also in area 610 served by hub 602, goods may be transported between hub 602 and one or more customer locations 636, 638, and 640. For example, the goods may be transported between hub 602 and spoke 606 via route 650, and between spoke 606 and any of customer locations 636, 638, 640 via route 634.

Area 616, which is served by spoke 608, may include one or more customer locations 644, 646, and 648. As indicated by route 642, a vehicle may execute orders at one or more of customer locations 644, 646, and 648. For example, begging at spoke 608, a vehicle following route 642 may execute an order at customer location 644, continue to customer location 646 to execute another order, and then proceed to customer location 648 to execute a third order. The vehicle may then return to spoke 608. If the vehicle is delivering goods to any of customer locations 644, 646, and 648, the vehicle may be loaded with the goods at spoke 608 before proceeding on route 642. Otherwise, if the vehicle is picking up an order from any of customer locations 644, 646, 648, the vehicle may pick up the order from the customer location and deliver it to spoke 608 upon the vehicle's return.

Because spoke 608 is also in area 610, goods may be transported between hub 602 and one or more customer locations 644, 646, and 648. For example, the goods may be transported between hub 602 and spoke 608 via route 650, and between spoke 608 and any of customer locations 644, 646, 648 via route 642.

In some examples, multiple catchments can be setup at hubs and spokes with no overlaps in the catchments. In addition, each catchment can have its own order delivery mechanism (e.g., its own vehicle fleet, 3rd party carrier, etc.).

Figure 7:
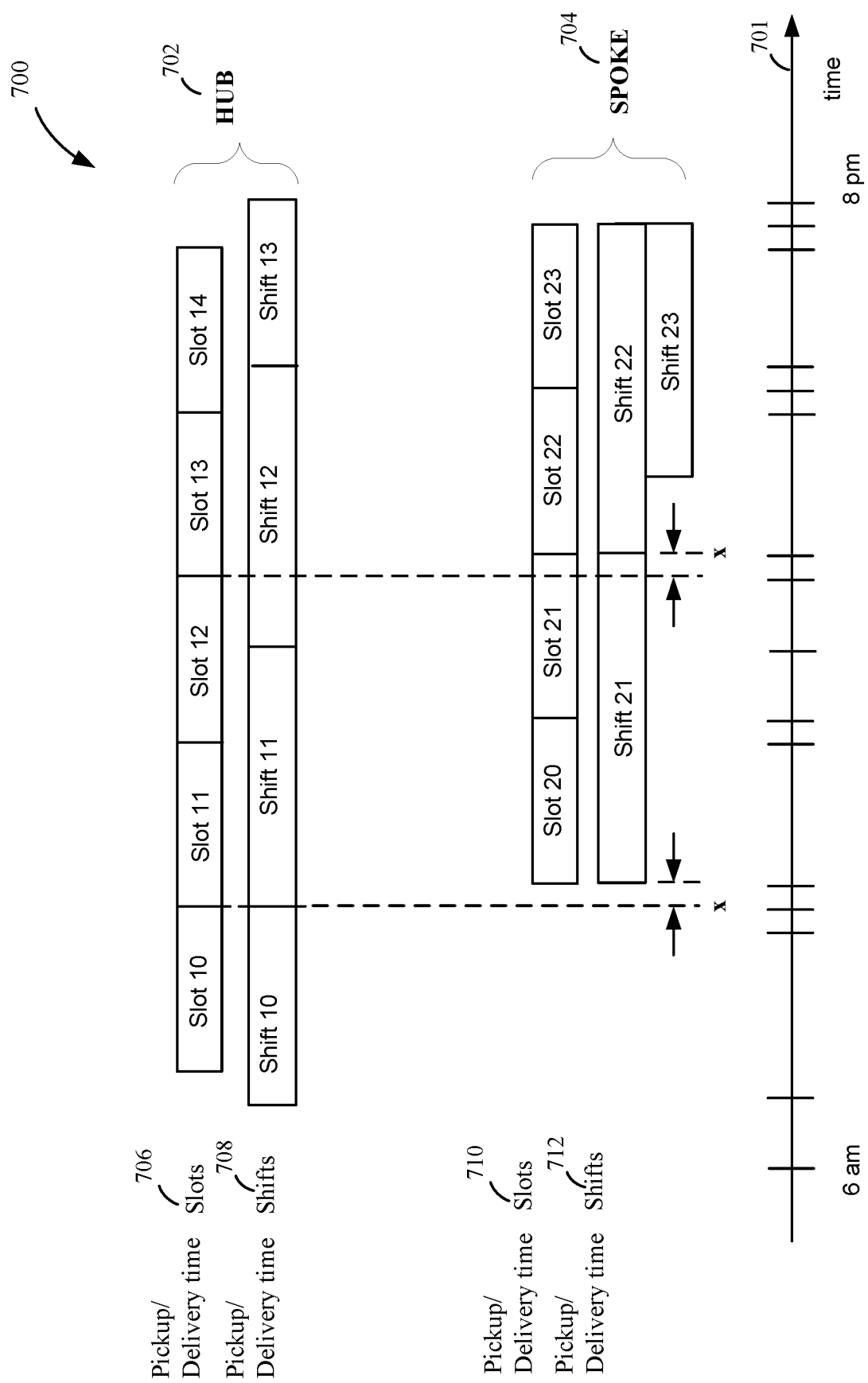
FIG. 7 illustrates an exemplary diagram of vehicle availability that may be used with the system shown in FIG. 6, in accordance with some embodiments of the present disclosure.

FIG. 7 illustrates a diagram 700 of vehicle availability that may be used, for example, with the system 600 shown in FIG. 6. Along the bottom, the diagram includes a timeline 701 that identifies the times of a day. The diagram also includes pick-up/delivery time slots 710 that identify windows of time along timeline 701 that a customer, executing an order in an area served by spoke 704, may execute an order (e.g., have an order delivered or picked up). For example, time slots 710 may include windows of time that a customer may have an order delivered to their home. In addition, the diagram includes pick-up/delivery hub shifts 708 that identify windows of time along timeline 701 that a vehicle, servicing spoke 704, is available for order execution, for example, along a route from spoke 704 that serves the customer.

The diagram of FIG. 7 also includes pick-up/delivery time slots 706 that identify windows of time along timeline 701 that a customer, executing an order in an area served by hub 702, may execute an order. For example, time slots 706 may include windows of time that a customer may have an order delivered to their home.

In addition, the diagram includes pick-up/delivery hub shifts 708 that identify windows of time along timeline 701 that a vehicle, servicing hub 702 and spoke 704, is available for order execution. For example, hub shifts 708 may include windows of time that a vehicle is available to proceed along a route from hub 702 to spoke 704. Each hub shift 708 may include a hub start time, and a hub end time. The hub end time may be offset by the hub start time by a time window width (i.e., hub start time+time window width=hub end time).

Similarly, the diagram includes pick-up/delivery spoke shifts 712 that identify windows of time along timeline 701 that a vehicle, servicing spoke 704 and a customer, is available for order execution. For example, spoke shifts 712 may include windows of time that a vehicle is available to proceed along a route from spoke 704 to a customer. Each spoke shift 712 may include a spoke start time, and a spoke end time. The spoke end time may be offset by the spoke start time by a time window width (i.e., spoke start time+time window width=spoke end time).

Time slots 706 and 710 may be, for example, similar to the time slots discussed above with respect to FIG. 2. For example, server 105 may also maintain a database of vehicle availability, such as hub and spoke time shifts 708 and 710, which it may use to determine available time slots for presentation to a user (e.g., via user terminals 120, 125, and 130 of FIG. 1). Based upon what time slot 710 a customer selects, the one or more hub and spoke shifts 708, 710 may be determined for order execution. For example, based a time slot 710 selected by a customer for delivery of an order in an area serviced by spoke 704, a hub shift 708 may be selected, during a vehicle is to deliver the order contents from hub 702 to spoke 704. In addition, a spoke shift 712 may be determined to have the order contents delivered from spoke 704 to the destination location. For example, based on the selected hub shift 708, a spoke shift 712 may be selected to have a vehicle deliver the order contents from the spoke 704 to the order destination.

In some examples a server, such as server 105, which may be located at hub 702, may select a hub shift 708 and a spoke shift 710 for an order. In some examples, a local server, such as one located at a spoke, such as spoke 704, may determine the hub shift 708 and the spoke shift 712 for an order.

In one example, the hub and spoke shifts 708, 710 are determined in the following manner. Given a requested order execution time slot 710 for an order execution in an area served by spoke 704, the earliest starting spoke shift 712 that overlaps in time with the requested order execution time slot 710 is selected. For example, assume time slot 23 was requested. Both spoke shifts 22 and 23 overlap in time with time slot 23. However, spoke shift 22 has an earlier starting time than spoke shift 23. Thus, spoke shift 22 is selected. The selected spoke shift 22 represents the vehicle shift (e.g., time window) that the order contents will be delivered to, or picked up from, the order's delivery/pick-up location. In some examples, the selected starting spoke shift 712 must overlap in time with the requested execution time slot 710 by at least a threshold amount (e.g., 30 minutes).

Based on the selected spoke shift 712, a hub shift 708 is selected. The selected hub shift 708 may have an ending time that is a minimum amount of time before the start of the selected spoke shift 712. For example, the selected spoke shift 712 may have an ending time that is before the start of the selected spoke shift 712 by a transport time, which may be the estimated amount of time that it takes to transport goods from hub 702 to spoke 704. In some examples, the minimum amount of time includes a lead time. The lead time may be a buffer amount of time that attempts to ensure that the vehicle has enough time to deliver the goods to the spoke 704 before the selected spoke shift 712 begins. In some examples, the minimum amount of time includes one or more of the following: an amount of time it takes to load goods onto a vehicle at the hub (e.g., hub loading time), an amount of time it takes to unload the goods at the spoke (e.g., spoke unloading time), and an amount of time it takes to load the goods onto a vehicle at the spoke for customer delivery (e.g., spoke loading time). The minimum amount of time may include one or more of the transport time, the lead time, the hub loading time, the spoke unloading time, and the spoke loading time.

For example, as shown in FIG. 7, the amount of time between hub shift 10 and spoke shift 21 is identified as "X." If X is equal to or greater than the minimum amount of time, then hub shift 10 may be used to deliver goods from hub 702 to spoke 704 such that the goods may be placed on a vehicle servicing an area serviced by spoke 704 during spoke shift 21. In one example, the minimum amount of time is equal to the transit time between hub 702 and spoke 704, and a lead time. In one example, the minimum amount of time is equal to the transit time between hub 702 and spoke 704, the loading time at hub 702, the unloading time at spoke 704, the loading time at spoke 704, and a lead time.

In some examples, orders for a same time slot 710, 706 that are to be delivered to a same location, such as spoke 704, may be combined and delivered concurrently. For orders that are to be delivered from a hub directly to a customer (e.g., a customer location within the area served by the hub), a customer may select a hub time slot 706.

In some examples, a hub start time for a hub shift 708 must be less than or equal to a spoke start time for a spoke shift 712. In some examples, new customer orders are not accepted (e.g., "cut-off") at a spoke before they are not allowed at a corresponding hub. For example, a spoke cut-off time for a spoke shift 712 would be required to be less than or equal to a hub cut-off time for a hub shift 708. In this manner, cut-off times for all spokes served by a hub would happen at the same time as, or before, the cut-off time for the serving hub.

Figure 8:
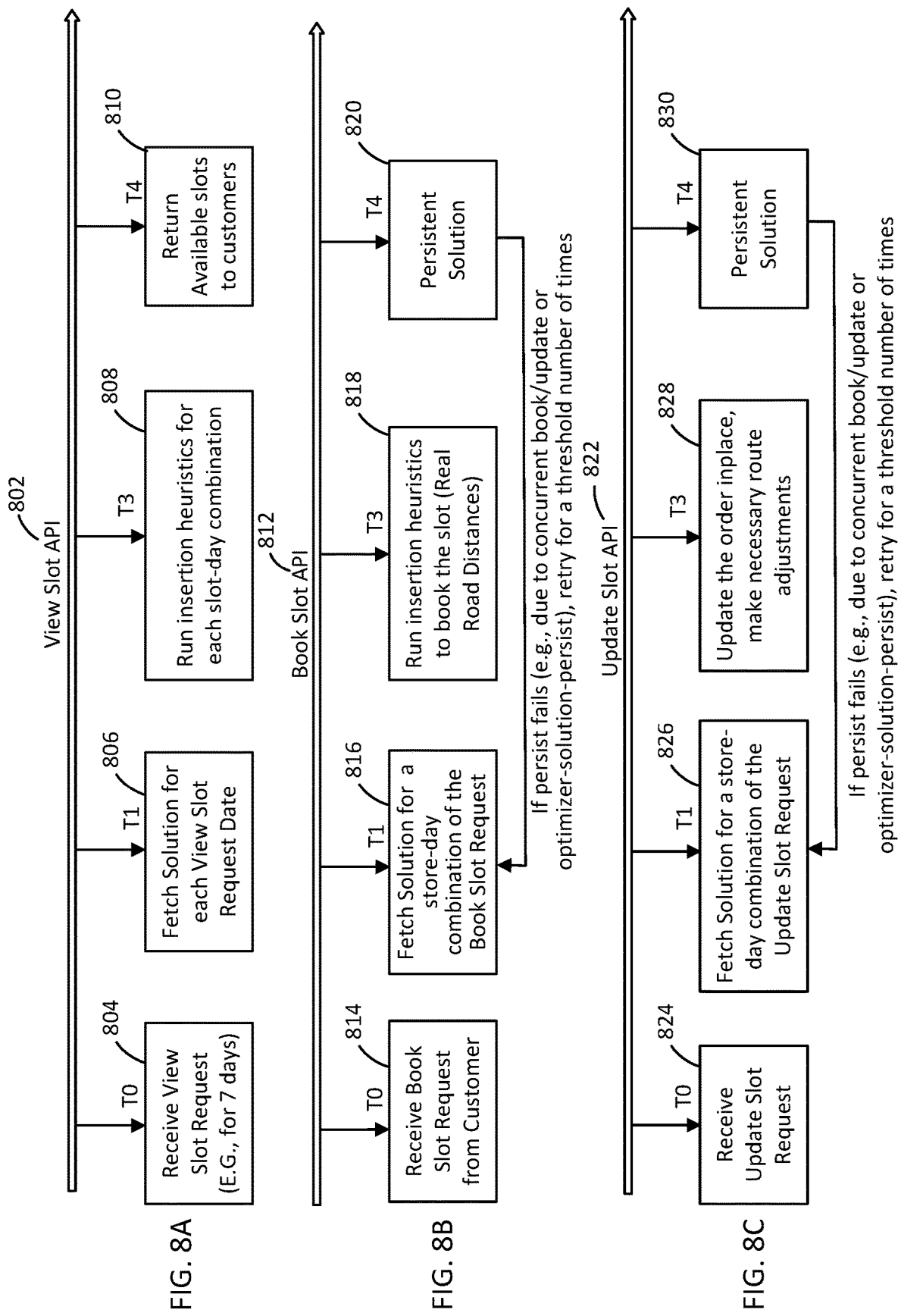
FIG. 8A illustrates a flow diagram representing an example application programming interface (API) that may be used to view time slots available for vehicle deliveries, in accordance with some embodiments of the present disclosure.
FIG. 8B illustrates a flow diagram representing an example API that may be used to book time slots available for vehicle deliveries, in accordance with some embodiments of the present disclosure.
FIG. 8C illustrates a flow diagram representing an example API that may be used to update time slots available for vehicle deliveries, in accordance with some embodiments of the present disclosure.

FIG. 8A illustrates a flow diagram representing an example application programming interface (API) 802 that may be used to view time slots available for vehicle deliveries using, for example, the system 100 shown in FIG. 1A. The time slots shown may correspond, for example, to the hub time slots 706 or spoke time slots 710 of FIG. 7. At step 804, a view slot request is received. For example, a terminal, such as terminals 120, 125, and 130 of FIG. 1, may transmit a view slot request to server 105 of FIG. 1. The view slot request may be a request to view available time slots for order execution, such as order delivery or pick-up, over a period of time (e.g., a week). At step 806, for each day requested, a time slot solution is requested. The time slot solution may be one or more time slots that may be available for order execution on a particular day.

At step 808, insertion heuristics are executed for each available slot for a particular day. Insertions heuristics relate to logic that system 100 may use to determine whether a new customer order can be accepted, within an acceptable cost. The factors to be considered may include, for example, vehicle capacity, total travel time and distance, whether other orders will be affected, etc. For example, server 105 may determine whether the customer may place an order for each time slot returned in step 806 by determining whether one or more of a hub shift and a spoke shift are available to deliver to the customer the contents associated with the order, such as described with respect to FIG. 6. At step 810, time slots that have been determined to be available are returned. For example, server 105 may send one or more time slots that have been determined to be available for order execution to one or more of terminals 120, 125, and 130 for display.

FIG. 8B illustrates a flow diagram representing an example API 812 that may be used to book time slots available for vehicle deliveries using, for example the system 100 shown in FIG. 1A. The time slots shown may correspond, for example, to the hub time slots 706 or spoke time slots 710 of FIG. 7. At step 814, a book slot request is received. A book slot request may be received, for example, when a customer places an item for purchase in their online shopping cart. The book slot request may be received by, for example, server 105 from a terminal, such as terminals 120, 125, and 130. At step 816, for each day requested, a time slot solution is requested. The time slot solution may be one or more time slots that may be available for order execution on a particular day. At step 818, insertion heuristics are executed for the time slot to determine whether the time slot can be booked. For example, server 105 may determine whether the customer may book the time slot returned in step 816 by determining whether one or more of a hub shift and a spoke shift are available to deliver to the customer the contents associated with the order, such as described with respect to FIG. 6. At step 820, if the time slot was successfully book, the method ends. Otherwise, if the time slot was not able to be book, the method proceeds back to step 816, where the booking of another time slot may be attempted. The booked time slot may be sent by server 105 to one or more of terminals 120, 125, 130 for display.

FIG. 8C illustrates a flow diagram representing an example API 822 that may be used to update time slots available for vehicle deliveries using, for example, the system 100 shown in FIG. 1A. The time slots shown may correspond, for example, to the hub time slots 706 or spoke time slots 710 of FIG. 7. At step 824, an update slot request is received. In some examples, the update slot request is received when a customer completes checkout, such that the order weight and volume capacity has been determined. The update slot request may be received by, for example, server 105 from a terminal, such as terminals 120, 125, and 130. At step 826, for each time slot for each day requested, a time slot solution is requested. The time slot solution may be one or more time slots that may be available for order execution on the particular day. At step 828, the update is made, including any necessary route adjustments. For example, if the day of the order changed, then the existing route is changed to remove the order from it, and instead the order is added to a route that available during the updated time slot. At step 830, if the time slot was successfully updated, the method ends. Otherwise, if the time slot was not successfully updated, the method proceeds back to step 826, where the update is attempted for a different time slot. The updated time slot may be sent by server 105 to one or more of terminals 120, 125, 130 for display.

Figure 9:
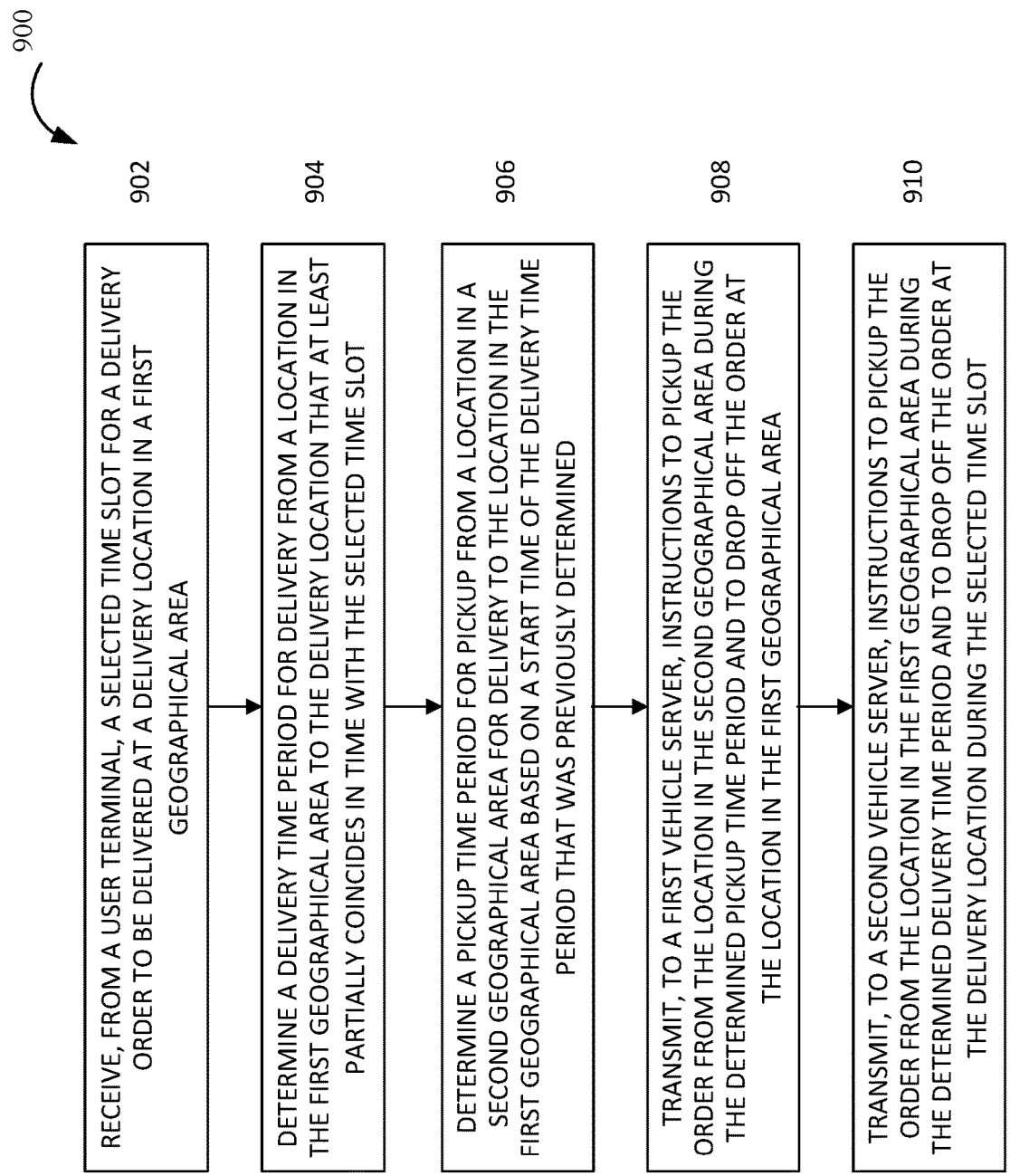
FIG. 9 illustrates a flow diagram of a method for optimizing a plurality of vehicle delivery routes in a hierarchical distribution design, in accordance with some embodiments of the present disclosure.

FIG. 9 illustrates a flow diagram of a method 900 for optimizing a plurality of vehicle delivery routes in a hierarchical distribution design, such as the example delivery system 600 described with respect to FIG. 6. At step 902, a selected slot for a delivery order is received from a user terminal. The delivery order is to be delivered at a delivery location in a first geographical area. The first geographical area may be, for example, an area serviced by a spoke, such as one of spokes 604, 606, 608 of FIG. 6. At step 904, a delivery time period from deliver from a location in the first geographical area to the delivery location is determined. The determination includes determining that the delivery time period at least partially coincides in time with the selected time slot.

At step 906, a pick-up time period for order pick-up from a location in a second geographical area for delivery to the location in the first geographical area is determined. The determination is based on a start time of the delivery time period determined is step 904. The second geographical area may be, for example, an area served by a hub, such as hub 602 of FIG. 6. At step 908, order instructions are transmitted to a first vehicle server. The instructions include instructions to pick up the order contents from the location in the second geographical area, and to drop off the order contents at the location in the first geographical area. For example, the instructions may include instructions to proceed on a route from a hub to a spoke for delivery of the order contents. At step 910, order instructions are transmitted to a second vehicle server. The instructions include instructions to pick up the order from the location in the first geographical area, and to drop off the order at the delivery location during the selected time slot. For example, the instructions may include instructions to proceed on a route from a spoke to a customer's home for delivery of the order contents.

Figure 10:
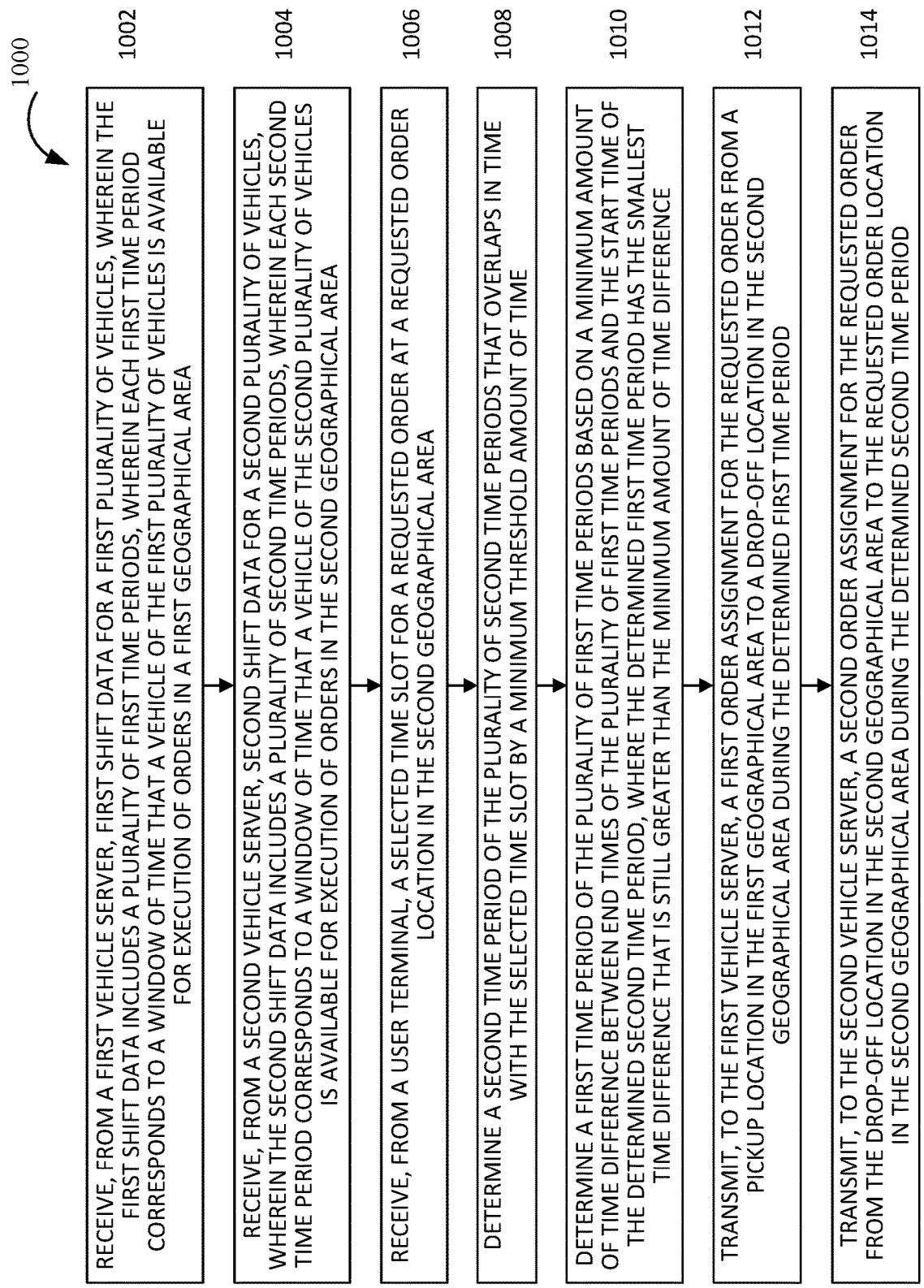
FIG. 10 illustrates a flow diagram of another method for optimizing a plurality of vehicle delivery routes in a hierarchical distribution design, in accordance with some embodiments of the present disclosure

FIG. 10 illustrates a flow diagram of a method 1000 for optimizing a plurality of vehicle delivery routes in a hierarchical distribution design, such as the example delivery system 600 described with respect to FIG. 6. At step 1002, a server, such as server 105 of FIG. 1, receives, from a first vehicle server, first shift data for a first plurality of vehicles. The first shift data includes a plurality of first time periods, where each first time period corresponds to a window of time that a vehicle of the first plurality of vehicles is available for execution of orders in a first geographical area. For example, first shift data can include one or more hub shifts as described with respect to FIG. 6.

At step 1004, the server receives, from a second vehicle server, second shift data for a second plurality of vehicles. The second shift data includes a plurality of second time periods, where each second time period corresponds to a window of time that a vehicle of the second plurality of vehicles is available for execution of orders in the second geographical area. For example, first shift data can include one or more spoke shifts as described with respect to FIG. 6.

At step 1006, the server receives, from a user terminal, a selected time slot for a requested order at a requested order location in the second geographical area. At step 1008, the server determines a second time period of the plurality of second time periods that overlaps in time with the selected time slot by a threshold amount. At step 1010, the server determines a first time period of the plurality of first time periods based on a minimum amount of time between end times of the plurality of first time periods and the start time of the determined second time period. The minimum amount of time can include, for example, a transit time and a lead time. In this example, the determined first time period has the smallest time difference that is still greater than the minimum amount of time.

At step 1012, the server transmits, to the first vehicle server, a first order assignment for the requested order from a pick-up location in the first geographical area to a drop-off location in the second geographical area during the determined first time period. For example, the first order assignment can include instructions to deliver goods from a hub in the first geographical area to a spoke in the second geographical area. At step 1014, the server transmits, to the second vehicle server, a second order assignment for the requested order from the drop-off location in the second geographical area to the requested order location in the second geographical area during the determined second time period. For example, the second order assignment can include instructions to deliver the goods from the spoke in the second geographical area to the requested order location.

Figure 11:
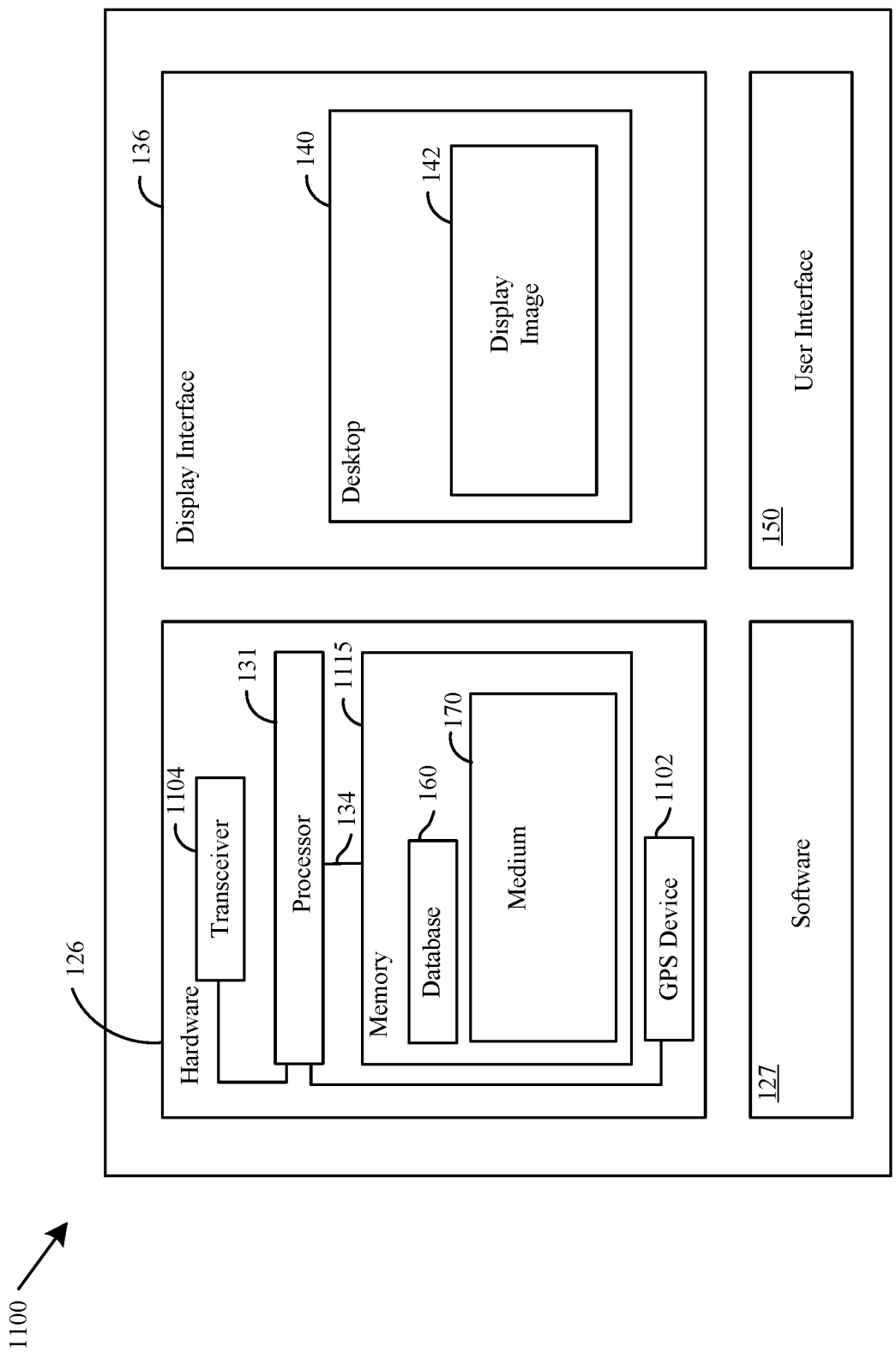
FIG. 11 illustrates an exemplary computing device that may be used with the system shown in FIG. 1A, in accordance with some embodiments of the present disclosure.

FIG. 11 is a block diagram of an exemplary computing device 1110, which may be used to implement a computing device of one or more of vehicles 128*a-c* (shown in FIG. 1A). In some embodiments, computing device 1110 includes a hardware unit 126 and software 127. Software 127 can run on hardware unit 126 such that various applications or programs can be executed on hardware unit 126 by way of software 127. In some embodiments, the functions of software 127 can be implemented directly in hardware unit 126, e.g., as a system-on-a-chip, firmware, field-programmable gate array ("FPGA"), etc. In some embodiments, hardware unit 126 includes one or more processors, such as processor 131. In some embodiments, processor 131 is an execution unit, or "core," on a microprocessor chip. In some embodiments, processor 131 may include a processing unit, such as, without limitation, an integrated circuit ("IC"), an ASIC, a microcomputer, a programmable logic controller ("PLC"), and/or any other programmable circuit. Alternatively, processor 131 may include multiple processing units (e.g., in a multi-core configuration). The above examples are exemplary only, and, thus, are not intended to limit in any way the definition and/or meaning of the term "processor."

Hardware unit 126 also includes system memory 1115 coupled to processor 131 via a system bus 234. For example, hardware unit 126 can include a 32 bit microcomputer with 2 Mbit ROM and 64 Kbit RAM, and/or a few GB of RAM. Memory 1115 can also be a ROM, a network interface (MC), and/or other device(s).

In some embodiments, computing device 1110 can also include at least one media output component or display interface 136 for use in presenting information to a user. Display interface 136 can be any component capable of conveying information to a user and may include, without limitation, a display device (not shown) (e.g., a liquid crystal display ("LCD"), an organic light emitting diode ("OLED") display, or an audio output device (e.g., a speaker or headphones)). In some embodiments, computing device 110 can output at least one desktop, such as desktop 140. Desktop 140 can be an interactive user environment provided by an operating system and/or applications running within computing device 1110, and can include at least one screen or display image, such as display image 142. Desktop 140 can also accept input from a user in the form of device inputs, such as keyboard and mouse inputs. In some embodiments, desktop 140 can also accept simulated inputs, such as simulated keyboard and mouse inputs. In addition to user input and/or output, desktop 140 can send and receive device data, such as input and/or output for a FLASH memory device local to the user, or to a local printer.

In some embodiments, display image 142 can be presented to a user on computer displays of a remote terminal (not shown). For example, computing device 110 can be connected to one or more remote terminals (not shown) or servers (not shown) via a network (not shown), wherein the network can be the Internet, a local area network ("LAN"), a wide area network ("WAN"), a personal area network ("PAN"), or any combination thereof, and the network can transmit information between computing device 110 and the remote terminals or the servers, such that remote end users can access the information from computing device 1110.

In some embodiments, computing device 1110 includes an input or a user interface 150 for receiving input from a user. User interface 150 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface. In some embodiments, mobile devices, such as tablets, can be used.

Computing device 1110, in some embodiments, can include a database 160 within memory 1115, such that various information can be stored within database 160. Alternatively, in some embodiments, database 160 can be included within a remote server (not shown) with file sharing capabilities, such that database 160 can be accessed by computing device 110 and/or remote end users. In some embodiments, a plurality of computer-executable instructions can be stored in memory 1115, such as one or more computer-readable storage media 170. Computer storage medium 170 includes non-transitory media and may include volatile and nonvolatile, removable and non-removable mediums implemented in any method or technology for storage of information such as computer-readable instructions, data structures, program modules or other data. The instructions may be executed by processor 131 to perform various functions described herein, e.g., steps of the method shown in FIG. 13.

In some examples, hardware unit 126 also includes a global positioning system (GPS) device 1102 coupled to processor 131. GPS device 1102 may be configured by processor 131 to determine a geographic location of computing device 1110 (e.g., a latitude, longitude, altitude, etc.) at regular temporal intervals, and to store data indicative of the determined geographic location within a portion of corresponding tangible, non-transitory memory (e.g., within a portion of system memory 1115), along with data identifying the temporal interval (e.g., a time and/or date). In some embodiments, computing device 1110 may be configured to determine an actual delivery time for a delivery based on data obtained via GPS device 102.

For example, computing device 1110 may be located on vehicle 128a. Processor 131 may be configured to determine a geographic location of vehicles 128a based on data obtained from GPS device 1102. Processor 131 may also be configured to determine whether vehicle 128a is moving based on the obtained data. For example, processor 131 may determine that vehicle 128a has stopped moving if the data obtained from GPS device 1102 indicates that vehicle's 128a latitude and longitude have not changed for a minimum amount of time (e.g., 3 minutes). Processor 131 may determine that vehicle 128a arrived at a delivery destination at the beginning of the time period associated with the minimum amount of time. Processor 131 may determine and store an arrival time and/or date associated with the beginning of the time period (e.g., as indicated by data from GPS device 1102 identifying a temporal interval corresponding to the beginning of the time period). Processor 131 may also determine that vehicle 128a has left the delivery location when data obtained from GPS device 1102 indicates that vehicle 128a is moving again (e.g., latitude or longitude has changed from when vehicle 128a was determined to have been not moving). Processor 131 may determine and/or store a departure time and/or date associated with when vehicle 128a begins moving again (e.g., as indicated by data from GPS device 1102 identifying a temporal interval corresponding to when vehicle 128a begins moving). Processor 131 may determine the delivery time for the delivery based on the time difference between the arrival time and the departure time.

In some examples, processor 131 may determine when vehicle 128a arrives at a delivery location by comparing a latitude and longitude of the delivery address to vehicle's 128a latitude and longitude as determined by data obtained from GPS device 1102. If the each of the latitudes and longitudes are within a maximum threshold, respectively, processor 131 may determine that vehicle 128a has arrived at the delivery location. Processor 131 may then determine an arrival time based on, for example, data from GPS device 1102 corresponding to when processor 131 determines vehicle 131a has arrived at the delivery location. Processor 131 may also determine when vehicle 128a departs from a delivery location by comparing the latitude and longitude of the delivery address to vehicle's 128a latitude and longitude as determined by data obtained from GPS device 1102. If one or more of the latitudes and longitudes are beyond (e.g., greater) than a maximum threshold, respectively, processor 131 may determine that vehicle 128a has departed from the delivery location. Processor 131 may then determine a departure time based on, for example, data from GPS device 1102 corresponding to when processor 131 determines vehicle 131a has departed from the delivery location. Processor 131 may determine the delivery time for the delivery based on the time difference between the arrival time and the departure time.

In some embodiments, hardware unit 126 also includes a transceiver 1104 coupled to processor 131, which allows for communications with a network, such as network of FIG. 1A. Transceiver 1104 may allow, for example, for the transmission, and reception, of data with one or more of server 105, one or more user terminals, such as terminals 120, 125, and 130, and vehicle server 128, of FIG. 1A. In some examples, a driver of a delivery vehicle, such as vehicle 128a, may provide an input to computing device 1110 to indicate that the vehicle has arrived at a delivery location. For example, the driver may provide an input via user interface 150. Similarly, the driver of the vehicle may provide another input to computing device 1110 to indicate that the vehicle is leaving the delivery location. Computing device 1110 may determine an actual delivery time for the delivery based on the inputs. For example, computing device 1110 may determine a time difference between times associated with each of the inputs to determine the delivery time.

In some embodiments, computing device 1110 transmits the measured delivery time to one or more of server 105, one or more user terminals, such as terminals 120, 125, and 130, and vehicle server 128. The measured delivery times may be stored in a database, such as database 160, and cumulated with delivery times for other delivery orders. Each of the delivery times may be associated with one or more purchase order features (such as those identified in FIG. 13), which may also be stored in a database, such as database 160. The measured delivery times may be used to train one or more of the machine learning processes, such as ordinary least squares regression, ridge regression, support vector regression (SVRs), such as SVR using a linear kernel, random forest, XGBoost, or any other suitable machine learning process. For example, server 105 may cumulate measured delivery times and associated purchase order features for purchase orders over a period of time (e.g., a week, a month, a year). One or more of the exemplary machine learning processes may be trained against the cumulated delivery times and associated purchase order features. In some examples, one or more of the purchase order features may be assigned a weight. The weight may be modified during training to determine purchase order feature weights that produce most accurate delivery time estimations. The exemplary machine learning processes may then be used to estimate a delivery time for a further delivery of a purchase order based on one or more of the associated features to the purchase order, as described below with respect to FIG. 12.

Figure 12:
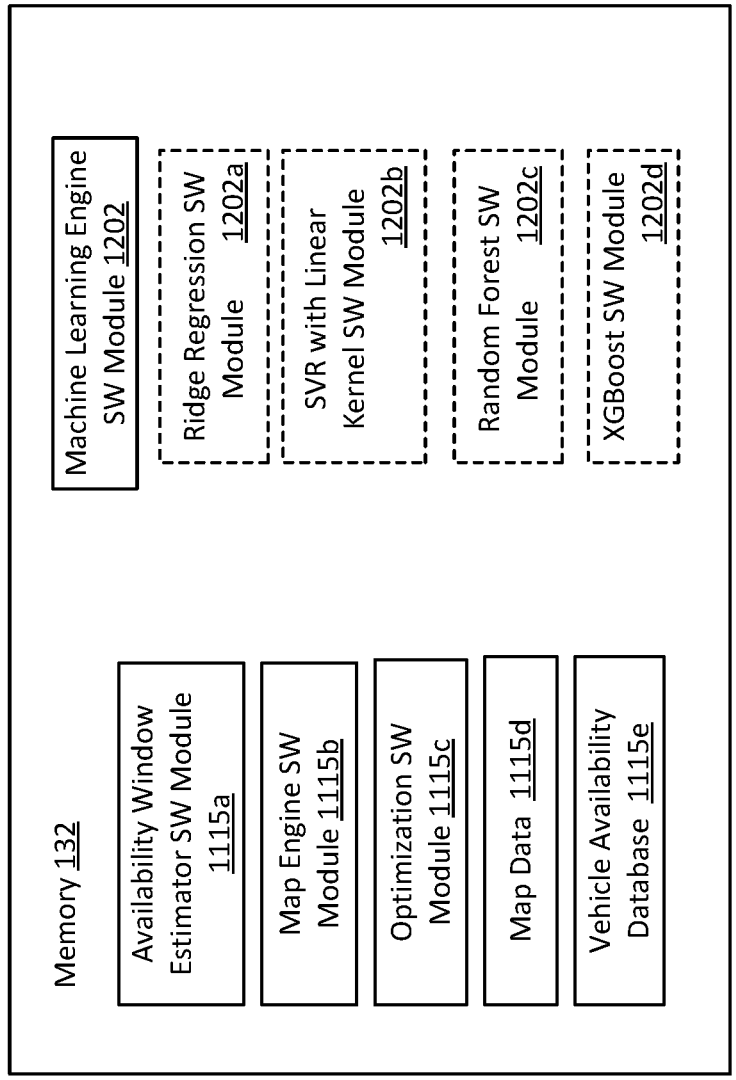
FIG. 12 illustrates an exemplary memory for storing instructions for executing steps of a method that may be used with the system shown in FIG. 1A, in accordance with some embodiments of the present disclosure.

FIG. 12 illustrates an example of computer-executable instructions that can be stored in memory 132 of FIG. 1A as software (SW) modules. Memory 132 may include the following SW modules: (1) an availability window estimator SW module 1115a that is configured to determine a number of available time slots for delivery of groceries; (2); a map engine SW module 1115b that is configured to assign delivery orders to vehicles and determine the sequence in which a particular vehicles orders will be delivered (delivery route); (3) an optimization SW module 1115c that is configured to optimize the delivery route for each vehicle having at least one delivery order assigned to it. Memory 132 may further store map data 1115d of the geographic area serviced by one or more store fronts as well as a vehicle availability database 1115e that stores a snapshot of the current capacity of each vehicle in the plurality of vehicles and the time slots each vehicle has available.

In some embodiments, memory 132 may also include machine learning engine SW module 1202, which, when executed by processor 131, may cause processor 131 to apply one or more machine learning processes to data identifying one or more purchase order features associated with a particular delivery. For example, machine learning engine SW module 1202 may include one or more of: (1) ridge regression SW module 1202a; (2) SVR with linear kernel SW module 1202b; (3) random forest SW module 1202c; (4) XGBoost SW module 1202d; or any other suitable machine learning SW module. Ridge regression SW module 1202a, when executed by processor 131, may cause processor 131 to execute ridge regression algorithms (e.g., models) based on one or more purchase order features associated with a delivery order to estimate a delivery time. Similarly, SVR with linear kernel SW module 1202b, when executed by processor 131, may cause processor 131 to execute SVR algorithms based on one or more purchase order features associated with a delivery order to estimate a delivery time. Random forest SW module 1202c, when executed by processor 131, may cause processor 131 to execute random forest algorithms based on one or more purchase order features associated with a delivery order to estimate a delivery time. XGBoost SW module 1202d, when executed by processor 131, may cause processor 131 to execute XGBoost algorithms based on one or more purchase order features associated with a delivery order to estimate a delivery time. The purchase order features may include, for example, any of the purchase order features identified in FIG. 13. In some examples, processor 131 assigns weights to one or more of the purchase order features for use with a particular machine learning process. The weights assigned may be the weights determined during training of the particular machine learning process.

FIG. 13 identifies four example categories of purchase order features. The four categories include item based purchase order features 1302, time and geo based purchase order features 1304, shipping source purchase order features 1306, and delivery destination based purchase order features 1308. The item based features 1302, and their descriptions, are listed in table 1 below:

TABLE 1

| ITEM BASED FEATURE | DESCRIPTION |
|---|---|
| CARRIER_BAG | Items in purchase order bagged with carrier bags |
| HAS_AGE_RESTRICTED ITEMS | Purchase order includes age restricted items |
| HAS_AMBIENT | Purchase order includes items at ambient or room temperature |
| HAS_CHILLED | Purchase order includes chilled items |
| HAS_FROZEN | Purchase order includes frozen items |
| ORDER_WEIGHT | Purchase order has a weight of __ (e.g, lbs, kgs) |
| QUANTITY | Purchase order includes a quantity of items of __ |

The time and geo based purchase order features 1304, and their descriptions, are listed in table 2 below:

TABLE 2

| TIME AND GEO BASED FEATURE | DESCRIPTION |
|---|---|
| MONTH_SIN | sin component of cyclic transformation to represent month in year |
| MONTH_COS | cos component of cyclic transformation to represent month in year |
| DAY_MONTH_SIN | sin component of cyclic transformation to represent day in month |
| DAY_MONTH_COS | cos component of cyclic transformation to represent day in month |
| DAY_WEEK_SIN | sin component of cyclic transformation to represent day in week |
| DAY_WEEK_COS | cos component of cyclic transformation to represent day in week |
| MORNING_DELIVERY | Purchase order to be delivered in the morning |
| AFTERNOON_DELIVERY | Purchase order to be delivered in the afternoon |
| EVENING_DELIVERY | Purchase order to be delivered in the evening |
| IS_WEEKEND | Purchase order to be delivered on the weekend |
| LATITUDE | Latitude of delivery location |
| LONGITUDE | Longitude of delivery location |

The shipping source purchase order features 1306, and their descriptions, are listed in table 3 below:

TABLE 3

| SHIPPING SOURCE FEATURE | DESCRIPTION |
|---|---|
| STORE_ID_4401 | Example identification number of a store the purchase order is being shipped from |
| STORE_ID_4441 | Example identification number of a store the purchase order is being shipped from |

TABLE 3-continued

| SHIPPING SOURCE FEATURE | DESCRIPTION |
| --- | --- |
| STORE_ID_4831 | Example identification number of a store the purchase order is being shipped from |
| STORE_ID_4863 | Example identification number of a store the purchase order is being shipped from |

The delivery destination based purchase order features 1308, and their descriptions, are listed in table 4 below:

TABLE 4

| DELIVERY DESTINATION FEATURE | DESCRIPTION |
| --- | --- |
| APARTMENT_BLOCK: Extra Large | Destination building is part of Extra Large apartment block |
| APARTMENT_BLOCK: Large | Destination building is part of Large apartment block |
| APARTMENT_BLOCK: Medim | Destination building is part of Medium sized apartment block |
| APARTMENT_BLOCK: Small | Destination building is part of Small sized apartment block |
| APARTMENT_BLOCK: Very Large | Destination building is part of Very Large apartment block |
| DETACHED | Destination building is detached |
| FLAT | Destination building is flat |
| SEMI-DETACHED | Destination building is semi-detached |
| TERRACED | Destination building includes a terrace |
| UNKNOWN | Destination building type is unkown |

The product order features may be used, for example, to train a machine learning process, or to execute a machine learning process. In some examples, server 105 may be configured to select one of a plurality of machine learning processes based on one or more of purchase order features associated with a purchase order. For example, server 105 may select a machine learning process to estimate a delivery time for a future delivery based on a time and geo based feature 1304 such as whether the delivery is scheduled for the morning ("morning_delivery"), afternoon ("afternoon_delivery"), or evening ("evening_delivery"). As another example, server 105 may select a machine learning process to estimate a delivery time for a future delivery based on an item based features 1302 such as the order weight ("order_weight").

To determine which machine process to select, server 105 may be configured to test the various machine learning process with test data based on previous deliveries to determine which machine learning process better estimates delivery times given one or more purchase order features. For example, server 105 may be configured to apply a machine learning process to test data that includes particular purchase order features associated with a previous delivery, where the actual delivery time was measured (e.g., via the GPS device 1102 as described with respect to FIG. 11). Server 105 can then be configured to apply a different machine learning process to the same test data. Server 105 may then compare the estimated delivery times for each of the machine learning processes to the measured delivery time associated with the test data. Server 105 may determine that the machine learning process that estimates a delivery time that is closest to the measured delivery time is the machine learning model that is to be selected when applying a machine learning process to a future purchase order that includes the same, or similar, purchase order features. In some examples, server 105 stores in a database, such as database 160, data identifying the machine learning model that is to be selected for future delivery purchase orders associated with particular purchase order feature combinations.

Among other advantages, the application of a machine learning process to estimate delivery times as described herein may result in more accurate delivery time estimates for future purchase order deliveries, which may allow for more accurate route and time slot scheduling, and a reduction in delivery costs.

Figure 14:
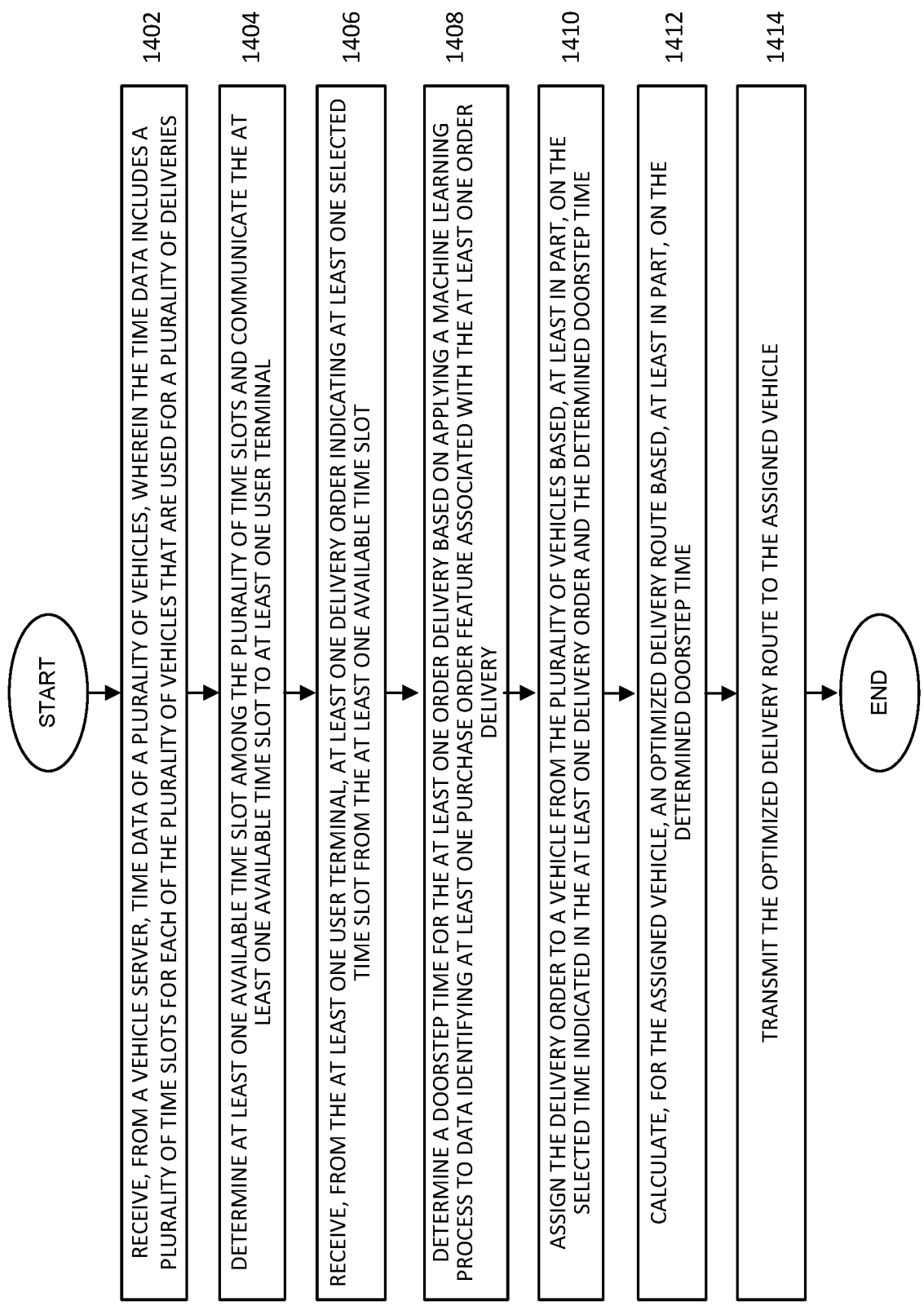
FIG. 14 illustrates a flow diagram of a method for optimizing a plurality of vehicle delivery routes during delivery of goods using the system shown in FIG. 1A, in accordance with some embodiments of the present disclosure.

FIG. 14 illustrates a flow diagram of a method 1400 for optimizing a plurality of vehicle delivery routes during delivery of goods using, for example, the system shown in FIG. 1A. Beginning at step 1402, a computing device, such as server 105, receives from a vehicle server, such as vehicle server 128, time data for a plurality of vehicles. The time data includes a plurality of time slots for each of the plurality of vehicles that are used for a plurality of deliveries. At step 1404, at least one available time slot is determined among the plurality of time slots. The at least one available time slot is communicated to at least one user terminal, such as user terminal 120. At step 1406, at least one delivery order is received from the at least one user terminal. The at least one delivery order indicates at least one selected time slot from the at least one available time slot. For example, a user of user terminal 120 may select a time slot from a list of available time slots that were received in step 1404, and are presented via a user interface of user terminal 120. User terminal 120 may transmit the selected time slot to server 105.

Proceeding to step 1408, a delivery time for the at least one order delivery is determined based on applying a machine learning process to data identifying at least one purchase order feature associated with the at least one order delivery. For example, server 105 may apply one or more of ridge regression, SVR using a linear kernel, random forest, or XGBoost machine learning processes to data that identifies a purchase order feature to determine the delivery time for the order delivery. Purchaser order features may include, for example, one or more of the item based purchase order features 1302, time and geo based purchase order features 1304, shipping source purchase order features 1306, and delivery destination based purchase order features 1308 described with respect to FIG. 13.

At step 1410, the delivery order is assigned to a vehicle from the plurality of vehicles based, at least in part, on the selected time indicated in the at least one delivery order and the determined delivery time. For example, server 105 may assign the delivery order to a vehicle where the additional time needed for the delivery order, including the delivery time, will not prevent completing any previously scheduled deliveries to that vehicle on time. At step 1412, an optimized delivery route is calculated based, at least in part, on the determined delivery time. At step 1414, the optimized delivery route is transmitted to the assigned vehicle. For example, server 105 may transmit the optimized delivery route to vehicle server 128, and vehicle server 128 may transmit the optimized delivery route to the corresponding vehicle.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. The computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. An apparatus comprising:
  a computing device including:
    a communications interface configured to communicate with, over one or more networks, a plurality of user terminals and a vehicle server, the vehicle server configured to communicate with a computing device of each of a plurality of vehicles;
  a memory resource storing instructions; and
  one or more processors communicatively coupled to the communications interface and memory resource, the one or more processors being configured to execute the instructions to:
    receive, over the one or more networks and from the vehicle server, time data of the plurality of vehicles, wherein the time data includes a plurality of time slots for each of the plurality of vehicles that are used for a plurality of deliveries;
    determine at least one available time slot among the plurality of time slots and communicate, over the one or more networks, the at least one available time slot to at least one user terminal of the plurality of user terminals;
    receive, over the one or more networks and from the at least one user terminal, at least one delivery order indicating at least one selected time slot from the at least one available time slot; and
    in response to receiving the at least one delivery order indicating the at least one selected time slot, implementing one or more vehicle resource optimization operations, the one or more vehicle resource optimization operations including:
      determining a test delivery time interval for each of a set of trained machine learning processes by applying each of the set of trained machine learning processes to test data including at least one time and geo based feature associated with a previous delivery and a determined delivery time interval of the previous delivery;
      selecting, from the set of trained machine learning processes, a trained machine learning process with a determined test delivery time interval that is closest to the determined delivery time interval of the previous delivery;
      training the selected trained machine learning process with a plurality of weights applied to the test data;
      determining at least one weight from the plurality of weights based on a closest match of a previously predicted delivery time interval to at least one actual delivery time associated with the test data;
      applying the at least one weight to a set of purchase order feature data to generate weighted purchase order feature data associated with the at least one delivery order;
      determining a predicted delivery time interval for the at least one delivery order by applying the selected trained machine learning process to the weighted purchase order feature data including at least one time and geo based feature associated with the at least one delivery order and at least one item based feature associated with the at least one delivery order, the item based feature characterizing one of a plurality of characteristics of at least one item of the at least one delivery order and the predicted delivery time interval being a predicted amount of time between when a vehicle arrives at a destination location of the at least one delivery order and when the vehicle departs the destination location;
      assigning the at least one delivery order to a vehicle from the plurality of vehicles based, at least in part, on the at least one selected time slot indicated in the at least one delivery order and the determined predicted delivery time interval;

calculating, for the assigned vehicle, an optimized delivery route based, at least in part, on the determined predicted delivery time interval; and transmit, over the one or more networks and to a computing device of the assigned vehicle via the vehicle server, the optimized delivery route.

2. The apparatus of claim 1 wherein the selected trained machine learning process applied to determine the predicted delivery time interval is at least one of: ridge regression, support vector regression using a linear kernel, random forest, and XGBoost.

3. The apparatus of claim 1 wherein the test data may further include at least one item based feature associated with the previous delivery.

4. The apparatus of claim 1 wherein the set of purchase order feature data further includes a shipping source feature, and a delivery destination based feature.

5. The apparatus of claim 1 wherein the one or more processors are configured to execute the instructions further to:
apply a first weight to data identifying a first purchase order feature of the set of purchase order feature data;
apply a second weight to data identifying a second purchase order feature of the set of purchase order feature data; and
apply the selected trained machine learning process to the first weighted data identifying the first purchase order feature and to the second weighted data identifying the second purchase order feature.

6. The apparatus of claim 1 wherein the computing device is configured to:
determine, based on the application of the selected trained machine learning process, that assigning the at least one delivery order to a first vehicle from the plurality of vehicles will prevent any previously scheduled deliveries assigned to the first vehicle from being completed on time;
determine, based on the application of the selected trained machine learning process, that assigning the at least one delivery order to a second vehicle from the plurality of vehicles will not prevent any previously scheduled deliveries assigned to the second vehicle from being completed on time; and
assign the at least one delivery order to the second vehicle from the plurality of vehicles.

7. A method comprising:
receiving, over one or more networks and from a vehicle server and by a processor, time data of a plurality of vehicles, wherein the time data includes a plurality of time slots for each of the plurality of vehicles that are used for a plurality of deliveries;
determining, by the processor, at least one available time slot among the plurality of time slots and communicate, over the one or more networks, the at least one available time slot to at least one user terminal of a plurality of user terminals;
receiving, over the one or more networks and from the at least one user terminal and by the processor, at least one delivery order indicating at least one selected time slot from the at least one available time slot;
in response to receiving the at least one delivery order indicating the at least one selected time slot, implementing, by the processor, one or more vehicle resource optimization operations, the one or more vehicle resource optimization operations including:

determining a test delivery time interval for each of a set of trained machine learning processes by applying each of the set of trained machine learning processes to test data including at least one time and geo based feature associated with a previous delivery and a determined delivery time interval of the previous delivery;

selecting, from the set of trained machine learning processes, a trained machine learning process with a determined test delivery time interval that is closest to the determined delivery time interval of the previous delivery;

training the selected trained machine learning process with a plurality of weights applied to the test data;

determining at least one weight from the plurality of weights based on a closest match of a previously predicted delivery time interval to at least one actual delivery time associated with the test data;

applying the at least one weight to a set of purchase order feature data to generate weighted purchase order feature data associated with the at least one delivery order;

determining a predicted delivery time interval for the at least one delivery order by applying the selected trained machine learning process to the weighted purchase order feature data associated with the at least one delivery order including at least one time and geo based feature associated with the at least one delivery order and at least one item based feature associated with the at least one delivery order, the item based feature characterizing one of a plurality of characteristics of at least one item of the at least one delivery order and the predicted delivery time interval being a predicted amount of time between when a vehicle arrives at a destination location of the at least one delivery order and when the vehicle departs the destination location;

assigning the at least one delivery order to a vehicle from the plurality of vehicles based, at least in part, on the at least one selected time slot indicated in the at least one delivery order and the predicted delivery time interval;

calculating, for the assigned vehicle, an optimized delivery route based, at least in part, on the predicted delivery time interval; and transmitting, over the one or more networks to a computing device of the assigned vehicle via the vehicle server and by the processor, the optimized delivery route.

8. The method of claim 7 wherein the selected trained machine learning process applied to determine the predicted delivery time interval is at least one of: ridge regression, support vector regression using a linear kernel, random forest, and XGBoost.

9. The method of claim 7, wherein the test data may further include at least one item based feature associated with the previous delivery.

10. The method of claim 7 wherein the set of purchase order feature data further includes a shipping source feature, and a delivery destination based feature.

11. The method of claim 7 further comprising:
applying a first weight to data identifying a first purchase order feature of the set of purchase order feature data;
applying a second weight to data identifying a second purchase order feature of the set of purchase order feature data; and
applying the selected trained machine learning process to the first weighted data identifying the first purchase order feature and to the second weighted data identifying the second purchase order feature.

12. The method of claim 7 further comprising training the selected trained machine learning process based on measured delivery times and associated purchase order features for previous purchase order deliveries.

13. The method of claim 7 further comprising:
determining, based on the application of the selected trained machine learning process, that assigning the at least one delivery order to a first vehicle from the plurality of vehicles will prevent any previously scheduled deliveries assigned to the first vehicle from being completed on time;
determining, based on the application of the selected trained machine learning process, that assigning the at least one delivery order to a second vehicle from the plurality of vehicles will not prevent any previously scheduled deliveries assigned to the second vehicle from being completed on time; and
assigning the at least one delivery order to the second vehicle from the plurality of vehicles.

14. A non-transitory computer readable medium having instructions stored thereon, wherein the instructions, when executed by at least one processor, cause a device to perform operations comprising:
receiving, over one or more networks and from a vehicle server, time data of a plurality of vehicles, wherein the time data includes a plurality of time slots for each of the plurality of vehicles that are used for a plurality of deliveries;
determining at least one available time slot among the plurality of time slots and communicate, over the one or more networks, the at least one available time slot to at least one user terminal of a plurality of user terminals;
receiving, over the one or more networks and from the at least one user terminal, at least one delivery order indicating at least one selected time slot from the at least one available time slot;
in response to receiving the at least one delivery order indicating the at least one selected time slot, implementing one or more vehicle resource optimization operations, the one or more vehicle resource optimization operations including:
determining a test delivery time interval for each of a set of trained machine learning processes by applying each of the set of trained machine learning processes to test data including at least one time and geo based feature associated with a previous delivery and a determined delivery time interval of the previous delivery;
selecting, from the set of trained machine learning processes, a trained machine learning process with a determined test delivery time interval that is closest to the determined delivery time interval of the previous delivery;
training the selected trained machine learning process with a plurality of weights applied to the test data;
determining at least one weight from the plurality of weights based on a closest match of a previously predicted delivery time interval to at least one actual delivery time associated with the test data;
applying the at least one weight to a set of purchase order feature data to generate weighted purchase order feature data associated with the at least one delivery order;
determining a predicted delivery time interval for the at least one delivery order by applying the selected trained machine learning process to the weighted purchase order feature data associated with the at least one delivery order including at least one time and geo based feature associated with the at least one delivery order and at least one item based feature associated with the at least one delivery order, the item based feature characterizing one of a plurality of characteristics of at least one item of the at least one delivery order and the predicted delivery time interval being a predict amount of time between when a vehicle arrives at a destination location of the at least one delivery order and when the vehicle departs the destination location;
assigning the at least one delivery order to a vehicle from the plurality of vehicles based, at least in part, on the at least one selected time slot indicated in the at least one delivery order and the determined predicted delivery time interval;
calculating, for the assigned vehicle, an optimized delivery route based, at least in part, on the predicted delivery time interval; and
transmitting, over the one or more networks to a computing device of the assigned vehicle via the vehicle server, the optimized delivery route.

15. The non-transitory computer readable medium of claim 14 wherein the selected trained machine learning process applied to determine the predicted delivery time interval is at least one of: ridge regression, support vector regression using a linear kernel, random forest, and XGBoost.

16. The non-transitory computer readable medium of claim 14 further comprising instructions stored thereon that, when executed by the at least one processor, further cause the device to perform operations comprising:
applying a first weight to data identifying a first purchase order feature of the set of purchase order feature data;
applying a second weight to data identifying a second purchase order feature of the set of purchase order feature data; and
applying the selected trained machine learning process to the first weighted data identifying the first purchase order feature and to the second weighted data identifying the second purchase order feature.

17. The non-transitory computer readable medium of claim 14 further comprising instructions stored thereon that, when executed by the at least one processor, further cause the device to perform operations comprising:
determining, based on the application of the selected trained machine learning process, that assigning the at least one delivery order to a first vehicle from the plurality of vehicles will prevent any previously scheduled deliveries assigned to the first vehicle from being completed on time;
determining, based on the application of the selected trained machine learning process, that assigning the at least one delivery order to a second vehicle from the plurality of vehicles will not prevent any previously scheduled deliveries assigned to the second vehicle from being completed on time; and
assigning the at least one delivery order to the second vehicle from the plurality of vehicles.

* * * * *